(12) United States Patent
Zhang et al.

(10) Patent No.: US 12,553,048 B2
(45) Date of Patent: Feb. 17, 2026

(54) MULTI-TARGETED siRNA FOR TREATING CANCERS

(71) Applicant: NANJING UNIVERSITY, Nanjing (CN)

(72) Inventors: Chenyu Zhang, Nanjing (CN); Xi Chen, Nanjing (CN); Zheng Fu, Nanjing (CN); Jing Li, Nanjing (CN); Xiang Zhang, Nanjing (CN); Hongwei Liang, Nanjing (CN)

(73) Assignee: NANJING UNIVERSITY, Nanjing (CN)

(*) Notice: Subject to any disclaimer, the term of this patent is extended or adjusted under 35 U.S.C. 154(b) by 886 days.

(21) Appl. No.: 17/798,236

(22) PCT Filed: Dec. 11, 2020

(86) PCT No.: PCT/CN2020/135814
§ 371 (c)(1),
(2) Date: Aug. 8, 2022

(87) PCT Pub. No.: WO2021/121166
PCT Pub. Date: Jun. 24, 2021

(65) Prior Publication Data
US 2023/0193278 A1    Jun. 22, 2023

(30) Foreign Application Priority Data
Dec. 17, 2019  (CN) .......................... 201911304349.3

(51) Int. Cl.
*C12N 15/113* (2010.01)
*A61P 35/00* (2006.01)

(52) U.S. Cl.
CPC .......... *C12N 15/1137* (2013.01); *A61P 35/00* (2018.01); *C12N 15/1136* (2013.01); *C12N 15/1138* (2013.01); *C12N 2310/14* (2013.01)

(58) Field of Classification Search
None
See application file for complete search history.

(56) References Cited

U.S. PATENT DOCUMENTS

| | | | | |
|---|---|---|---|---|
| 2006/0241284 A1* | 10/2006 | Kuja-Panula | ........... | A61P 43/00 435/325 |
| 2011/0021604 A1* | 1/2011 | Brown | .................... | A61P 43/00 435/375 |
| 2018/0223277 A1* | 8/2018 | Zhang | ..................... | A61P 35/00 |

FOREIGN PATENT DOCUMENTS

| | | |
|---|---|---|
| CN | 1631443 A | 6/2005 |
| CN | 101492690 A | 7/2009 |
| CN | 104225617 A | 12/2014 |
| CN | 106661576 A | 5/2017 |
| CN | 109971756 A | 7/2019 |

OTHER PUBLICATIONS

Fakhr (Cancer Gene Therapy 23, 73-82) (Year: 2016).*
Watts et al. (Journal of Pathology 226:365-379) (Year: 2012).*
International Search Report with English Translation and Written Opinion for PCT Application No. PCT/CN2020/135814, dated Mar. 15, 2021, 11 pages.

* cited by examiner

*Primary Examiner* — Brian Whiteman
(74) *Attorney, Agent, or Firm* — JC ONE WORLD

(57) ABSTRACT

A multi-targeted siRNA for treating cancers is disclosed. Specifically, an siRNA composition is provided, comprising: a first siRNA molecule that reduces the expression of the first target gene; optionally, a coding sequence targeting a peptide element; and optionally, a second siRNA molecule that reduces the expression of the second target gene, wherein the first target gene is selected from the group consisting of EGFR, KRAS, or a combination thereof, and the siRNA composition reduces the expression of two or more genes. The siRNA or vector provided can be directly injected into the body to treat cancers.

14 Claims, 14 Drawing Sheets

Specification includes a Sequence Listing.

SEQUENCE LISTING

<160> NUMBER OF SEQ ID NOS: 5

<210> SEQ ID NO 1
<211> LENGTH: 20
<212> TYPE: RNA
<213> ORGANISM: Artificial
<220> FEATURE:
<223> OTHER INFORMATION: EGFR siRNA

<400> SEQUENCE: 1
uguggcuucu cuuaacuccu                                                    20

<210> SEQ ID NO 2
<211> LENGTH: 21
<212> TYPE: RNA
<213> ORGANISM: Artificial
<220> FEATURE:
<223> OTHER INFORMATION: KRAS siRNA

<400> SEQUENCE: 2
gcaaauacac aaagaaagcc c                                                  21

<210> SEQ ID NO 3
<211> LENGTH: 21
<212> TYPE: RNA
<213> ORGANISM: Artificial
<220> FEATURE:
<223> OTHER INFORMATION: TNC siRNA

<400> SEQUENCE: 3
cacacaagcc aucuacacau g                                                  21

<210> SEQ ID NO 4
<211> LENGTH: 1350
<212> TYPE: DNA
<213> ORGANISM: Artificial
<220> FEATURE:
<223> OTHER INFORMATION: Nucleotide sequence of targeted peptide element

<400> SEQUENCE: 4
atgtgcctct ctccggttaa aggcgcaaag ctcatcctga tctttctgtt cctaggagcc        60
gttcagtcca atgcattgat agttaatttg acagattcaa agggtacttg cctttatgct       120
cgatacacca tttggatgcc cgagaatccg agaccaggga cccttgtga cattttttacc       180 aatagcagag ggaagagagc atccaacggg tccggaggtg cagaatggga gatgaatttc       240
acaataacat atgaaactac aaaccaaacc aataaaacta taaccattgc agtacctgac       300
aaggcgacac acgatggaag cagttgtggg gatgaccgga atagtgccaa ataatgata       360 caatttggat tcgctgtctc ttgggctgtg aattttacca aggaagcatc tcattattca       420
attcatgaca tcgtgctttc ctacaacact agtgatagca cagtatttcc tggtgctgta       480
gctaaaggag ttcatactgt taaaaatcct gagaatttca agttccatt ggatgtcatc       540 tttaagtgca atagtgtttt aacttacaac ctgactcctg tcgttcagaa atattgggt       600 attcacctgc aagcttttgt ccaaaatggt acagtgagta aaaatgaaca agtgtgtgaa       660
gaagaccaaa ctcccaccac tgtggcaccc atcattcaca ccactgcccc gtcgactaca       720
actacactca ctccaacttc aacacccact ccaactccaa ctccaactcc aaccgttgga       780
aactacagca ttagaaatgg caatactacc tgtctgctgg ctaccatggg gctgcagctg       840
aacatcactg aggagaaggt gcctttcatt tttaacatca accctgccac aaccaacttc       900
accggcagct gtcaacctca agtgctcaa cttaggctga caacagcca aattaagtat       960

```
cttgacttta tctttgctgt gaaaaatgaa aaacggttct atctgaagga agtgaatgtc    1020
tacatgtatt tggctaatgg ctcagctttc aacatttcca acaagaacct agcttctgg     1080 gatgcccctc tgggaagttc ttatatgtgc aacaaagagc aggtgctttc tgtgtctaga    1140
gcgtttcaga tcaacacctt taacctaaag gtgcaacctt ttaatgtgac aaaaggacag    1200
tattctacag cccaggagtg ttcgctggat gatgacacca ttctaatacc aattatagtt    1260
ggtgctggtc tttcaggctt gattatcgtt atagtgattg cttacctaat tggcagaaga    1320
aagacctatg ctggatatca gactctgtaa                                     1350
```

<210> SEQ ID NO 5
<211> LENGTH: 5037
<212> TYPE: DNA
<213> ORGANISM: Artificial
<220> FEATURE:
<223> OTHER INFORMATION: Nucleotide sequence of vector

<400> SEQUENCE: 5

```
gttgacattg attattgact agttattaat agtaatcaat tacgggtca ttagttcata     60 gcccatatat ggagttccgc gttacataac ttacggtaaa tggcccgcct ggctgaccgc    120
ccaacgaccc ccgcccattg acgtcaataa tgacgtatgt tcccatagta acgccaatag    180
ggactttcca ttgacgtcaa tgggtggagt atttacggta aactgcccac ttggcagtac    240
atcaagtgta tcatatgcca agtacgcccc ctattgacgt caatgacggt aaatggcccg    300
cctggcatta tgcccagtac atgaccttat gggactttcc tacttggcag tacatctacg    360
tattagtcat cgctattacc atggtgatgc ggttttggca gtacatcaat gggcgtggat    420
agcggtttga ctcacgggga tttccaagtc tccaccccat tgacgtcaat gggagtttgt    480
tttggcacca aaatcaacgg gactttccaa aatgtcgtaa caactccgcc ccattgacgc    540
aaatgggcgg taggcgtgta cggtgggagg tctatataag cagagctctc tggctaacta    600
gagaacccac tgcttactgg cttatcgaaa ttaatacgac tcactatagg gagtcccaag    660
ctggctagtt aagctatcaa caagtttgta caaaaaagca ggctttaaaa ccgctaagca    720
cttcgtggcc gtcgatcgtt taagggagg tagtgagtcg accagtggat cctgaggct    780 tgctgaaggc tgtatgctgt gttgcttctc ttaattcctg ttttggccac tgactgacag    840
gaattaagaa gcaacacagg acacaaggcc tgttactagc actcacatgg aacaaatggc    900
ccagatctgg ccgcactcga gatatctaga cccagctttc ttgtacaaag tggttgatct    960
agagggcccg cggttcgctg atggggagg ctaactgaaa cacggaagga acaataccg      1020 gaaggaaccc gcgctatgac ggcaataaaa agacagaata aaacgcacgg gtgttgggtc    1080
gtttgttcat aaacgcgggg ttcggtccca gggctggcac tctgtcgata cccaccgtg     1140 accccattgg ggccaatacg cccgcgtttc ttccttttcc ccaccccacc cccaagttc     1200 gggtgaaggc ccagggctcg cagccaacgt cgggcggca ggcctgcca tagcatccc      1260 tatagtgagt cgtattacat ggtcatagct gtttcctggc agctctggcc cgtgtctcaa    1320
aatctctgat ggatctgcgc agctggggct ctaggggta tccccacgcg ccctgtagcg    1380
gcgcattaag cgcggcgggt gtggtggtta cgcgcagcgt gaccgctaca cttgccagcg    1440
ccctagcgcc cgctcctttc gctttcttcc cttcctttct cgccacgttc gccggctttc    1500
cccgtcaagc tctaaatcgg gggctccctt tagggttccg atttagtgct ttacggcacc    1560
tcgaccccaa aaaacttgat tagggtgatg gttcacgtag tgggccatcg ccctgataga    1620
```

-continued

```
cggttttttcg cccttttgacg ttggagtcca cgttctttaa tagtggactc ttgttccaaa   1680
ctggaacaac actcaaccct atctcggtct attcttttga tttataaggg attttgccga    1740
tttcggccta ttggttaaaa aatgagctga tttaacaaaa atttaacgcg aattaattct    1800
gtggaatgtg tgtcagttag ggtgtggaaa gtccccaggc tccccagcag gcagaagtat    1860
gcaaagcatg catctcaatt agtcagcaac caggtgtgga aagtcccag gctcccagc     1920 aggcagaagt atgcaaagca tgcatctcaa ttagtcagca accatagtcc cgcccctaac    1980
tccgcccatc ccgcccctaa ctccgcccag ttccgcccat tctccgcccc atggctgact    2040
aatttttttt atttatgcag aggccgaggc cgcctctgcc tctgagctat tccagaagta    2100
gtgaggaggc ttttttggag gcctaggctt ttgcaaaaag ctcccgggag cttgtatatc    2160
cattttcgga tctgatcagc acgtgttgac aattaatcat cggcatagta tatcggcata    2220
gtataatacg acaaggtgag gaactaaacc atggccaagc ctttgtctca agaagaatcc    2280
accctcattg aaagagcaac ggctacaatc aacagcatcc ccatctctga agactacagc    2340
gtcgccagcg cagctctctc tagcgacggc cgcatcttca ctggtgtcaa tgtatatcat    2400
tttactgggg gaccttgtgc agaactcgtg gtgctgggca ctgctgctgc tgcggcagct    2460
ggcaacctga cttgtatcgt cgcgatcgga atgagaaca ggggcatctt gagcccctgc    2520
ggacggtgcc gacaggtgct tctcgatctg catcctggga tcaaagccat agtgaaggac    2580
agtgatggac agccgacggc agttgggatt cgtgaattgc tgccctctgg ttatgtgtgg    2640
gagggctaag cacttcgtgg ccgaggagca ggactgacac gtgctacgag atttcgattc    2700
caccgccgcc ttctatgaaa ggttgggctt cggaatcgtt ttccgggacg ccggctggat    2760
gatcctccag cgcggggatc tcatgctgga gttcttcgcc caccccaact tgtttattgc    2820
agcttataat ggttacaaat aaagcaatag catcacaaat ttcacaaata aagcattttt    2880
ttcactgcat tctagttgtg gtttgtccaa actcatcaat gtatcttatc atgtctgtat    2940
accgtcgctc ttccgctgct tcctcgctca ctgactcgct gcgctcggtc gttcggctgc    3000
ggcgagcggt atcagctcac tcaaaggcgg taatacggtt atccacagaa tcaggggata    3060
acgcaggaaa gaacatgtga gcaaaaggcc agcaaaaggc caggaaccgt aaaaaggccg    3120
cgttgctggc gtttttccat aggctccgcc cccctgacga gcatcacaaa aatcgacgct    3180
caagtcagag gtggcgaaac ccgacaggac tataaagata ccaggcgttt ccccctggaa    3240
gctccctcgt gcgctctcct gttccgaccc tgccgcttac cggatacctg tccgcctttc    3300
tcccttcggg aagcgtggcg ctttctcata gctcacgctg taggtatctc agttcggtgt    3360
aggtcgttcg ctccaagctg ggctgtgtgc acgaaccccc cgttcagccc gaccgctgcg    3420
ccttatccgg taactatcgt cttgagtcca acccggtaag acacgactta tcgccactgg    3480
cagcagccac tggtaacagg attagcagag cgaggtatgt aggcggtgct acagagttct    3540
tgaagtggtg gcctaactac ggctacacta agaacagt atttggtatc tgcgctctgc     3600
tgaagccagt taccttcgga aaagagttg gtagctcttg atccggcaaa caaaccaccg    3660
ctggtagcgg tggtttttt gtttgcaagc agcagattac gcgcagaaaa aaggatctc     3720 aagaagatcc tttgatcttt tctacggggt ctgacgctca gtggaacgac gcgtaactca    3780
```

```
cgttaaggga ttttggtcat gggtggctcg acgagggtta tttgccgact accttggtga    3840
tctcgccttt cacgtagtgg acaaattctt ccaactgatc tgcgcgcgag gccaagcgat    3900
cttcttcttg tccaagataa gcctgtctag cttcaagtat gacgggctga tactgggccg    3960
gcaggcgctc cattgcccag tcggcagcga catccttcgg cgcgattttg ccggttactg    4020
cgctgtacca aatgcgggac aacgtaagca ctacatttcg ctcatcgcca gcccagtcgg    4080
gcggcgagtt ccatagcgtt aaggtttcat ttagcgcctc aaatagatcc tgttcaggaa    4140
ccggatcaaa gagttcctcc gccgctggac ctaccaaggc aacgctatgt tctcttgctt    4200
ttgtcagcaa gatagccaga tcaatgtcga tcgtggctgg ctcgaagata cctgcaagaa    4260
tgtcattgcg ctgccattct ccaaattgca gttcgcgctt agctggataa cgccacggaa    4320
tgatgtcgtc gtgcacaaca atggtgactt ctacagcgcg gagaatctcg ctctctccag    4380
gggaagccga agtttccaaa aggtcgttga tcaaagctcg ccgcgttgtt tcatcaagcc    4440
ttacggtcac cgtaaccagc aaatcaatat cactgtgtgg cttcaggccg ccatccactg    4500
cggagccgta caaatgtacg gccagcaacg tcggttcgag atgcgctcg atgacgccaa     4560 ctacctctga tagttgagtc gatacttcgg cgatcaccgc ttccctcata atgtttaact    4620
ttgttttagg gcgactgccc tgctgcgtaa catcgttgct gctccataac atcaaacatc    4680
gacccacggc gtaacgcgct tgctgcttgg atgcccgagg catagactgt accccaaaaa    4740
aacagtcata acaagccatg aaaaccgcca ctgccgcgtt accaccgctg cgttcggtca    4800
aggttctgga ccagttgcgt gagcgcatac gctacttgca ttacagctta cgaaccgaac    4860
aggcttatgt ccactgggtt cgtgccttca tccgtttcca cggtgtgcgt cacccggcaa    4920
ccttgggtag cagcgaagtc gaggcatttc tgtcctggct ggtctagaat tgcatgaaga    4980
atctgcttag ggttaggcgt tttgcgctgc ttcgcgatgt acgggccaga tatacgc      5037
```

MULTI-TARGETED siRNA FOR TREATING CANCERS

CROSS-REFERENCE TO RELATED APPLICATION(S)

This present application is a national stage application of International Patent Application No. PCT/CN2020/135814, filed Dec. 11, 2020, which claims priority to Chinese Patent Application No. 201911304349.3, filed Dec. 17, 2019, the disclosures of which are hereby incorporated by reference in their entireties.

FIELD

The present invention belongs to the field of biotechnology, and relates to a multi-targeted siRNA for cancer treatment.

BACKGROUND

SiRNAs can specifically bind mRNA and interfere with gene expression at the post-transcriptional level. Therefore, in order to deliver siRNA drugs directly to the established target cells, tissues or organs, it is inevitable to deliver drugs through the blood circulation system. How to deliver siRNAs safely, effectively and stably to target cells or organs in vivo is also the most critical problem in the development of siRNA drugs. At present, the in vivo delivery strategies of siRNA drugs can be divided into several categories: direct delivery of naked siRNA, viral vectors, chemical modification, nanoparticles and liposomes. Take synthetic unmodified naked siRNA as an example. After intravenous injection, siRNAs need to flow with the blood circulation until they reach the target cells. During this period, a large part of siRNAs will be filtered out of the body by the kidney, and a part will be disposed of by phagocytes. However, the delivery methods of chemical modification, nano-vectors, liposome or viral vectors have their own safety problems.

In recent years, another delivery method that has made rapid progress is siRNA transmission technology based on exosomes. Its advantage is that exosomes can encapsule and protect miRNAs (siRNA analogues) to freely cross cell membranes and biological barriers and reach recipient cells. It is a natural carrier for miRNA transmission between cells and tissues. This method has been widely reported to be successful in a variety of disease models, but these experiments are often performed regardless of cost. However, in the actual operation process, packaging of siRNAs into exosomes requires large-scale cell culture, which is time-consuming, labor-consuming and expensive. In addition, the separation and purification of exosomes also requires a lot of human and material resources, so mass production of exosome-based siRNAs is not realistic. On the other hand, due to the complex process of producing exosome-based siRNAs, there are high requirements for cell state, separation process and personnel operation, which makes it difficult to ensure the consistency between batches. Therefore, it is difficult to meet the requirements of production quality control and realize industrial production.

Synthetic biology refers to the design and creation of parts, devices or modules by using engineering concepts and system design theory. With specific products as the goal, various standardized functional components are assembled together. At the same time, through the optimization and control of the overall path, a new artificial biological system with predetermined functions is formed, so as to achieve large-scale application of synthetic biology system in chemicals, medicine, diagnosis and treatment of major diseases, agriculture, energy, environment and other fields. In the field of drug research and development, synthetic biology provides safe, efficient and controllable experimental tools and verification methods for the development of new biomedical technologies, which have been applied to in-vivo library construction and the discovery, synthesis, delivery and optimization of drugs.

Therefore, there is an urgent need in the art to develop a method for in-vivo therapy directly using artificially designed plasmids.

SUMMARY

An object of the present invention is to provide a method for in-vivo therapy directly using artificially designed plasmids.

In the first aspect of the present invention, provided is a siRNA composition comprising:
  a first siRNA molecule that reduces the expression of a first target gene;
  optionally, a coding sequence for a targeting peptide element; and
  optionally, a second siRNA molecule that reduces the expression of a second target gene,
  wherein the first target gene is selected from the group consisting of EGFR, KRAS, or a combination thereof, and the siRNA composition reduces the expression of two or more genes.

In another preferred embodiment, the second target gene is selected from the group consisting of EGFR, TNC, or a combination thereof.

In another preferred embodiment, the first target gene and the second target gene are different.

In another preferred embodiment, the first siRNA molecule has a sequence as shown in SEQ ID NO: 1 or 2.

In another preferred embodiment, the sequence of the first siRNA molecule is as shown in SEQ ID NO: 1 or 2.

In another preferred embodiment, the second siRNA molecule has a sequence as shown in SEQ ID NO: 3.

In another preferred embodiment, the sequence of the second siRNA molecule is as shown in SEQ ID NO: 3.

In another preferred embodiment, the targeting peptide element is selected from the group consisting of RVG, LAMP2B, or a combination thereof.

In another preferred embodiment, the targeting peptide element is a fusion protein consisting of RVG and LAMP2B.

In another preferred embodiment, the sequence of the targeting peptide element is as shown in SEQ ID NO: 4.

In the second aspect of the present invention, provided is a vector comprising:
  a promoter element;
  a first siRNA molecule that reduces the expression of a first target gene;
  optionally, a coding sequence for a targeting peptide element; and
  optionally, a second siRNA molecule that reduces the expression of a second target gene; wherein the first target gene is selected from the group consisting of EGFR, TNC, KRAS, or a combination thereof, and the siRNA molecule reduces the expression of two or more genes In another preferred embodiment, the vector has a structure represented by Formula I in 5'-3':

Z0-Z1-Z2-Z3    (I), wherein Z0 is a promoter element;

Z1 is an optional coding sequence for a targeting peptide element;

Z2 is the first siRNA molecule that reduces the expression of the first target gene; and Z3 is an optional second siRNA molecule that reduces the expression of the second target gene.

In another preferred embodiment, the promoter element comprises a constitutive promoter.

In another preferred embodiment, the promoter element is selected from the group consisting of CMV, U6, or a combination thereof.

In another preferred embodiment, the second target gene is selected from the group consisting of EGFR, TNC, KRAS, or a combination thereof.

In another preferred embodiment, the first target gene and the second target gene are different.

In another preferred embodiment, the first siRNA molecule has a sequence as shown in SEQ ID NO: 1 or 2.

In another preferred embodiment, the second siRNA molecule has a sequence as shown in SEQ ID NO: 3.

In another preferred embodiment, the targeting peptide element is selected from the group consisting of RVG, LAMP2B, or a combination thereof.

In another preferred embodiment, the targeting peptide element is a fusion protein consisting of RVG and LAMP2B.

In another preferred embodiment, the sequence of the targeting peptide element is as shown in SEQ ID NO: 4.

In another preferred embodiment, the sequence of the vector is as shown in SEQ ID NO: 5.

In another preferred embodiment, the expression vector comprises viral vectors and non-viral vectors.

In another preferred embodiment, the viral vectors comprise vectors of retrovirus, lentivirus, adenovirus and adeno-associated virus.

In another preferred embodiment, the expression vector is a plasmid.

In the third aspect of the present invention, provided is the use of the siRNA composition described in the first aspect of the present invention or the vector described in the second aspect of the present invention in preparing a medicament or formulation for treating cancer.

In another preferred embodiment, the treatment is a therapy performed by injecting the siRNA composition described in the first aspect of the invention or the vector described in the second aspect of the present invention directly into the body.

In another preferred embodiment, the cancer is selected from the group consisting of lung cancer, glioblastoma, or a combination thereof. In another preferred embodiment, the formulation is a liquid formulation.

In another preferred embodiment, the siRNA composition or vector in the medicament or formulation has a concentration of 0.5 mg/kg-20 mg/kg, preferably 1 mg/kg-10 mg/kg, more preferably 5 mg/kg-10 mg/kg.

In the fourth aspect of the present invention, provided is a pharmaceutical formulation comprising:

(a) the vector described in the second aspect of the present invention; and (b) a pharmaceutically acceptable carrier.

In another preferred embodiment, the formulation is in a liquid dosage form.

In another preferred embodiment, the formulation is an injection.

In another preferred embodiment, the vector comprises a plasmid.

In another preferred embodiment, the vector or plasmid comprises a promoter, a replication origin and a marker gene.

In another preferred embodiment, the vector in the pharmaceutical preparation has a concentration of 0.5 mg/kg-20 mg/kg, preferably 1 mg/kg-10 mg/kg, more preferably 5 mg/kg-10 mg/kg.

In another preferred embodiment, the pharmaceutical preparation comprises other drugs for treating cancer.

In another preferred embodiment, the other drugs for treating cancer include gefitinib.

In the fifth aspect of the present invention, provided is a method for treating cancer including:

directly injecting to an object in need thereof the siRNA composition described in the first aspect of the present invention, the vector described in the second aspect of the present invention or the pharmaceutical preparation described in the fourth aspect of the present invention.

In another preferred embodiment, the administration is performed at a dose of 0.5 mg/kg-20 mg/kg, preferably 1 mg/kg-10 mg/kg, more preferably 5 mg/kg-10 mg/kg.

In another preferred embodiment, the administration comprises an injection of a plasmid.

It should be understood that, within the scope of the present invention, the above technical features of the present invention and the technical features specifically described in the following (e.g., in the Examples) may be combined with each other to form a new or preferred technical solution. Due to space limitations, they will not be repeated here one by one.

BRIEF DESCRIPTION OF DRAWINGS

FIGS. 2A-C: The plasmid molecule CMV-siRE was transfected into LLC cells. The expression level of siRNA (A) and the inhibition on the mRNA (B) and protein (C) expression levels of EGFR gene were detected; FIGS. 2D-F: The plasmid molecule CMV-RVG-siRE+T was transfected into U87MG cells. The expression level of siRNA (D) and the inhibition on the mRNA (E) and protein (F) expression levels of EGFR and TNC genes were detected. * means $p<0.05$,  means $p<0.01$, and * means $p<0.005$.

FIG. 3A: Detection of the levels of the siRNA expression element and mature siRNA in liver tissue; FIG. 3B: Detection of siRNA levels in tissues such as lung, kidney, kidney, spleen, brain, heart, pancreas and muscle as well as CD4+ T cells, respectively; FIG. 3C: Detection of the expression level of siRNA in the mouse plasma and siRNA amount in plasma exosomes at the above time points.

FIG. 4A: Representative CT scan 3D imaging results; FIG. 4B: Changes in mouse tumor volume; FIG. 4C: Survival statistics. * means p<0.05,  means p<0.01, and * means p<0.005.

FIG. 5A: Representative CT scan 3D imaging results; FIG. 5B: Changes in mouse tumor volume; FIG. 5C: Survival statistics. * means p<0.05,  means p<0.01, and * means p<0.005.

FIG. 6A: Representative intravital imaging results; FIG. 6B: Changes in mouse tumor volume; FIG. 6C: Survival statistics; FIG. 6D: Statistical curve of radiance over days; FIG. 6E: Statistical curve of survival rate over days; * means p<0.05,  means p<0.01, and * means p<0.005.

FIGS. 7A-F: Effects of plasmid administration on biochemical indexes such as glutamic-pyruvic transaminase, glutamic-oxaloacetic transaminase, total bilirubin, urea, alkaline phosphatase and creatinine in serum of mice; FIG. 7G: Effects of plasmid administration on the tissue structure of mice.

DETAILED DESCRIPTION

Figure 1:
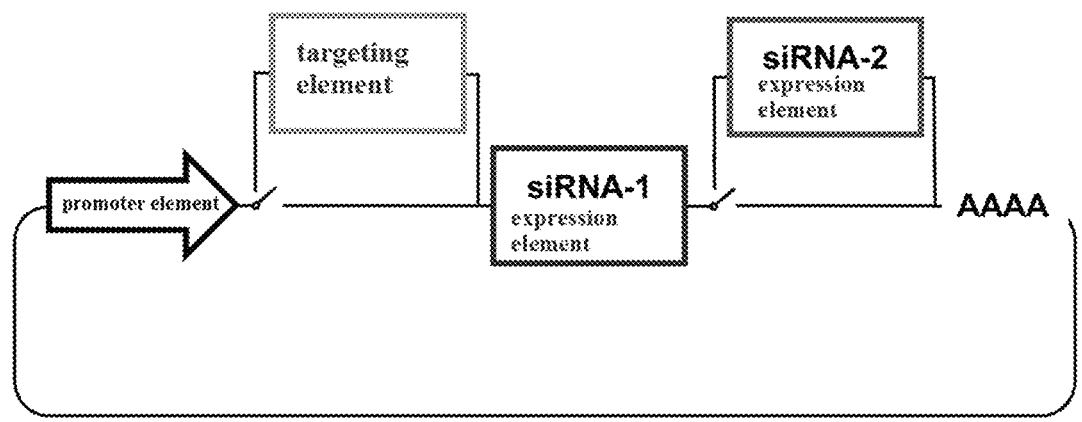
FIG. 1 shows a schematic diagram of the plasmid molecule comprising the gene element of the present invention.

After extensive and in-depth research, the inventors have developed a siRNA composition or vector for the first time, which comprises (a) a first siRNA molecule that reduces the expression of a first target gene; (b) optionally, a coding sequence for a targeting peptide element; and (c) optionally, a second siRNA molecule that reduces the expression of a second target gene, wherein the first target gene is selected from the group consisting of EGFR, KRAS, or a combination thereof, and the second target gene is selected from the group consisting of EGFR, TNC, or a combination thereof. Moreover, the siRNA composition can reduce the expression of two or more genes. The present invention has unexpectedly found that the siRNA composition or vector of the present invention can be injected directly into the body to directly form an exosome for the treatment of cancer. On this basis, the inventors have completed the present invention.

Terms

In order to understand the present disclosure more readily, certain terms are defined first. As used herein, each of the following terms should have the meaning given below unless expressly specified otherwise herein. Other terms are set forth throughout the application.

The term "about" may refer to a value or composition within an acceptable error range of a particular value or composition determined by one of ordinary skill in the art, which will depend, in part, on how the value or composition is measured or determined. For example, as used herein, the expression "about 100" includes all values between 99 and 101 (e.g., 99.1, 99.2, 99.3, 99.4, etc.).

As used herein, the terms "contain" or "include/comprise" may be open, semi-closed, and closed. In other words, the term also encompasses the meaning of "substantially consist of" or "consist of".

As used herein, the terms "host", "subject" and "object in need" refer to any mammal or non-mammal. Mammals include, but are not limited to, humans, vertebrates such as rodents, non-human primates, such as cattles, horses, dogs, cats, pigs, sheep, goats, camels, rats, mice, hares and rabbits.

First siRNA Molecules

In the present invention, the first siRNA molecule refers to a siRNA molecule capable of reducing the expression of the first target gene (such as EGFR or KRAS).

In a preferred embodiment, the sequence of the first siRNA is as shown in SEQ ID NO: 1 or 2.

SEQ ID NO. 1: UGUGGCUUCUCUUAACUCCU (EGFR siRNA);

SEQ ID NO. 2: GCAAAUACACAAAGAAAGCCC (KRAS siRNA).

Second siRNA Molecules

In the present invention, the second siRNA molecule refers to a siRNA molecule capable of reducing the expression of the second target gene (such as EGFR or TNC).

In a preferred embodiment, the sequence of the second siRNA is as shown in SEQ ID NO: 3.

SEQ ID NO. 3: CACACAAGCCAUCUACACAUG (TNC siRNA).

SiRNA Compositions

In the present invention, provided is a siRNA composition comprising:

a first siRNA molecule that reduces the expression of a first target gene;

optionally, a coding sequence for a targeting peptide element; and optionally, a second siRNA molecule that reduces the expression of a second target gene, wherein the first target gene is selected from the group consisting of EGFR, KRAS, or a combination thereof.

In a preferred embodiment, the second target gene is selected from the group consisting of EGFR, TNC, or a combination thereof.

In a preferred embodiment, the first target gene and the second target gene are different.

In the present invention, the siRNA composition of the present invention can reduce the expression of two or more genes. In addition, the siRNA composition of the present invention can be directly injected into the body to directly form exosomes in vivo for treating cancer.

Vectors

The present invention also provides a vector comprising the siRNA composition of the present invention. The expression vector typically further comprises a promoter, a replication origin and/or a marker gene, etc. Methods well known to those skilled in the art can be used to construct the expression vectors required in the present invention. These methods include in vitro recombinant DNA techniques, DNA synthesis techniques, in vivo recombination techniques, and the like. The expression vector preferably comprises one or more selectable marker genes to provide phenotypic traits for selection of transformed host cells, such as kamamycin, gentamicin, hygromycin or ampicillin resistance.

In the present invention, a representative promoter includes, but is not limited to, a CMV promoter, a U6 promoter, a T7 promoter, or a combination thereof.

Targeting Peptide Elements

In the present invention, the targeting peptide element is selected from the group consisting of, but not limited to, RVG- and LAMP2B. In a preferred embodiment, the targeting peptide element of the present invention comprises rabies virus glycoprotein. Rabies virus glycoprotein (RVG) is a neurotropic protein capable of binding to an acetylcholine receptor expressed by nerve cells. Rabies virus, belonging to the genus of rabies virus of rhabdoviridae, is a single-strand, negative-stranded RNA virus with an envelope. The virus mainly encodes the glycoprotein G, the G protein is anchored to the surface of the virus envelope in the form of a trimer, and can bind to the receptor of the cell surface to mediate membrane fusion, allowing the virus to invade into the cell. At the same time, G protein is a primary antigen protein of rabies virus, which stimulates the body to produce neutralizing antibodies. The RVG peptide specifically binds to the choline receptor expressed by neuronal cells and the RVG target is expressed outside the cell membrane to guide exosomes to transport across the blood-brain barrier to nerve cells.

In a preferred embodiment, the targeting peptide element of the present invention is RVG-LAMP2B, that is, a fusion protein consisting of RVG and LAMP2B.

Treatment Methods

The present invention further provides a method of treating cancer, that is, administering a safe and effective amount of the siRNA composition or vector or pharmaceutical formulation of the invention to an object in need, thereby treating cancer.

The main advantages of the present invention are as follows:

(1) The above synthetic biology design concept with the body's own miRNA secretion and circulation mechanism are combined for the first time, and mammals' own tissues and organs (mainly the liver) are creatively used as the natural biological cell chassis, directly using the artificially designed plasmid system for in vivo treatment.

(2) An in vivo siRNA targeted delivery method is established for the first time, which is characterized by the use of replaceable synthetic biology elements to construct a gene loop with complete functions. The biological element includes two parts: core elements and replaceable elements, in which the core elements consist of a promoter element and a first siRNA expression element; and the replaceable elements include a targeting element and a second siRNA expression element. SiRNA expression elements can effectively express one or more siRNAs in vivo and automatically assemble them into exosomes. The targeting element can express peptides with a function of targeting, which can be automatically expressed on the surface of exosome membranes, enabling exosomes to target specific cells or tissues. The promoter element can simultaneously initiate the expression of the above targeting peptides and siRNAs.

(3) Elements with different functions are constructed on the plasmid vector skeleton, and when the promoter element and the siRNA expression element are connected in series alone, the siRNA encapsuled by exosomes can be expressed in vivo; when the promoter element is connected in series with multiple siRNA expression elements, multiple siRNAs encapsuled with exosomes can be expressed; and when the promoter element, the targeting element and the siRNA expression element are connected in series, the exosomes into which siRNAs are encapsuled and capable of targeting specific tissues or cells can be expressed.

(4) Through the tail vein injection of plasmids expressing siRNAs, siRNAs can be detected in multiple tissues such as liver, lung, kidney, spleen, stomach and other tissues, but the precursor molecules thereof can only be detected in liver tissue, suggesting that plasmid molecules may be expressed in liver cells and secreted siRNAs into other tissues. By detecting the content of siRNAs in plasma and plasma exosomes, it was found that almost all the siRNA molecules in plasma were concentrated in plasma exosomes. After the plasmid with a promoter element, an RVG targeting element, a first siRNA expression element and a second siRNA expression element is introduced into the body through the tail vein injection, the siRNAs can pass through the blood brain barrier to reach the brain tissue, thereby inhibiting the expression of the two different genes.

(5) Plasmid molecules designed in the present invention can be processed and expressed in vivo to produce siRNAs, and the siRNA molecules are secreted into other tissues in the form of exosomes, achieving the targeted delivery of siRNA molecules so that they can cross the blood-brain barrier and reach the brain tissue to function. By using this system to deliver siRNAs inhibiting EGFR and KRAS genes, a good therapeutic effect has been obtained in the lung cancer orthotopic tumor transplantation model and transgenic animal tumor model respectively. By combined targeted delivery of siRNAs inhibiting TNC and EGFR genes across the blood-brain barrier to reach the brain tissue, a good therapeutic effect has been achieved in the glioblastoma orthotopic tumor transplantation model.

(6) The technical method for realizing siRNA autologous production and delivery of the invention has largely solved the problems of high production cost and easy degradation of siRNA at present, and is a low-cost and efficient way for siRNA drug production and delivery. At the same time, the present invention has demonstrated the safety based on this gene therapy mode.

The present invention is further described in detail below with reference to specific examples. It should be understood that these examples are only used to illustrate the present invention and are not intended to limit the scope of the present invention. The experimental methods in which detailed conditions are not specified in the following examples, usually under conventional conditions described in Sambrook et al. Molecular Cloning: Laboratory Manual (New York: Cold Spring Harbor Laboratory Press, 1989), or under conditions suggested by the manufacturer. Unless otherwise indicated, percentages and parts are calculated by weight. The experimental materials and reagents used in the following examples are all commercially available unless otherwise specified.

General Methods (1) Plasmid Construction:
1. Double Enzyme Digestion

The double enzyme digestion was carried out with BamH I (New England Biolab, Cat. No: #R0136) and Xho I (Biolabs, Cat. No: #R0146) as an example:

Reaction System:

| | |
|---|---|
| NEBuffer 3.1 | 5.0 µL |
| BamH I | 1.0 µL |
| Xho I | 1.0 µL |
| Vector DNA | 1.0 µg |
| ddH$_2$O | to 50 µL |
| Total volume | 50 µL |

Reaction Procedure:
  Incubation at 37° C. for 60 min;
  Electrophoresis (1% agarose); and
  Column purification. The purified samples were temporarily stored at −20° C.

2. Annealing

Two pairs of synthesized oligomeric single-stranded DNA were dissolved into 100 UM with ddH$_2$O and mixed with 5 µL of the respective complementary single-stranded DNA for annealing according to the system in Table 2. The two oligo mixture were heated at 95° C. for 5 min and then placed at room temperature for 20 min to obtain double-stranded DNA.

Oligo DNA Annealing System:

| | |
|---|---|
| 100 µM top strand oligo | 5 µL |
| 100 µM bottom strand oligo | 5 µL |
| 10X oligo annealing buffer | 2 µL |
| ddH$_2$O | 8 µL |
| Total volume | 20 µL |

3. Ligation

The annealed double-stranded DNAs were diluted to a concentration of 10 nM and ligated at room temperature for 30 min according to the system in Table 3.

T4 Enzyme Ligation System:

| | |
|---|---|
| 5X ligation buffer | 4 µL |
| Vector | 2 µL |
| ds oligo (10 nM) | 4 µL |
| T4 DNA ligase (1 U/µL) | 1 µL |
| ddH$_2$O | 9 µL |
| Total volume | 20 µL |

4. Transformation

10 µl of ligation product was transformed into 100 µl of competent cells DH5a, ice-bathed for 30 min, heat-shocked at 42° C. for 90-120 s, and ice-bathed for 5 min.

The transformed cells were spread on LB plates (containing 50 µg/ml spectinomycin), incubated overnight at 37° C., added with non-resistant LB medium, and incubated with shaking at 37° C. for 1 h.

500 µL of cell culture was spread on plates (containing spectinomycin) and incubated at 37° C. for 16 h.

5. Sequencing Verification

Three single colonies were picked from each transformation plate, cultured with shaking, and subjected to plasmid extraction for sequencing to verify whether the sequence of the inserted fragment in the recombinant clone was consistent with the designed oligomeric single-stranded DNA sequence.

(2) Cell Transfection:
1. Cells were seeded in culture plates (appropriate specifications selected according to experimental purposes) and cultured to a cell density of about 50%-80%.

2. Following the transfection instructions of Lipofectamine 2000, Lipofectamine 2000 was diluted with OPTI-MEM, mixed well by pipetting, and allowed to stand for later use (solution A).

3. With the same reference to the transfection instructions, an appropriate amount of the plasmid was diluted with OPTI-MEM as solution B for later use.

4. Solution A and solution B were mixed, pipetted for 10-15 times, and allowed to stand for 20 min. The cell culture medium to be transfected was replaced with OPTI-MEM.

5. The AB mixture was uniformly added dropwise to cells and shaken gently.

6. After 6 h of transfection, the medium was replaced with a medium containing 2% fetal bovine serum, and the cells were collected 36 hours later for subsequent experimental analysis.

(3) RNA Extraction:
1. 1 mL of Trizol was added (in a fume hood) per $10^7$ cells or 10 mg tissue, vigorously shaken well, and allowed to stand at room temperature for 10 min.

2. Trichloromethane with a volume of 1/5 Trizol was added (in a fume hood), vigorously shaken well, allowed to stand at room temperature for 5 min, and centrifuged at 12,000 g for 20 min.

3. The supernatant was removed carefully with a pipette without touching the protein layer, and added with 2 times the volume of isopropanol (pre-cooled), and allowed to stand at −20° C. for at least 1 h.

4. Samples were centrifuged at 12,000 g and 4° C. for 20 min, and washed with 75% ethanol which was prepared with DEPC water with an equal volume of Trizol.

5. Samples were centrifuged at 12,000 g and 4° C. for 15 min to completely discard the supernatant, and air-dried at room temperature for no more than 10 min.

6. Samples were dissolved with 25 µL of DEPC water.

(4) Large-Scale Extraction of Endotoxin-Free Plasmid:
  Taking 6 L bacteria solution as an example:
1. Culture with shaking: Each of six 2 L erlenmeyer flask was filled with 1 L of LB, and a total of 6 L bacteria solution was cultured with shaking for no more than 16 h.

2. The bacterial solution was loaded into three centrifuge bottles, balanced until centrosymmetry (no more than ½ in domestic bottles and no more than ⅔ in imported bottles), and centrifuged at 5,000 rpm for 10 min to collect the bacterial cells after discarding the supernatant.

3. To each centrifuge bottle, 75 mL of Solution 1 was added and shaken vigorously until no bulk material was visible.

4. To each of the three centrifuge bottles, 150 mL of Solution 2 was added, and flocculent viscous substances appeared. The bottles were shaken gently rather than violently, and the lysis process lasted for no more than 10 min.

5. To each of the three centrifuge bottles, 112.5 ml of pre-cooled Solution 3 was added and shaken sufficiently and gently until the precipitate was dispersed, where the white precipitate was visible.

6. After balancing, samples were centrifuged at 5,000 rpm and 4° C. for 20 min. The supernatant was filtered into the domestic centrifuge bottles with a CSI filter in the kit.

7. The imported bottles were washed and dried, and the filtrate in the domestic bottles was transferred to the imported bottles.

8. To each of the three centrifuge bottles, 210 ml of isopropanol was added, inverted for about 20 times to mix thoroughly, and precipitated at −20° C. for more than 1 h.

9. The solution obtained above was centrifuged at 5,000 rpm and 4° C. for 20 min, and the supernatant was discarded.

10. To one bottle, 60 mL of P1 was added and mixed vigorously. Then 30 mL was transferred from this bottle to each of the other two centrifuge bottles to obtain two centrifuge bottles each containing 30 mL of P1, which were shaken vigorously to dissolve the precipitate.

11. Bottles were allowed to stand at 37° C. for 10 min. To each of the two centrifuge bottles, 30 mL of P2 was added, inverted gently for several times, and allowed to stand for 7-9 min.

12. To each of the two centrifuge bottles, 30 mL of P2 was added, inverted gently for several times until white dispersed flocculent precipitate appeared in the solution, and allowed to stand for 7-9 min.

13. Samples were centrifuged at 5,000 rpm and 4° C. for 10 min.

14. The supernatant was filtered into one centrifuge bottle with a CSI filter in the kit.

15. 19 mL of red endotoxin removal solution ER was added and mixed by inversion.

16. 60 mL of isopropanol was added, mixed well, and precipitated at −20° C. for more than 1 h.

17. Column balance: To each of six adsorption columns, 2.5 mL of BL was added and centrifuged at 8,000 rpm for 2 min, and the liquid was discarded. (Angle rotor, round bottom, and the adsorption columns treated with the balancing solution were preferably used immediately).

18. Column chromatography: To each of the six adsorption columns, 10 mL of the culture liquid was added and centrifuged at 8,000 rpm for 2 min, and the liquid was discarded. The step was repeated until all the culture liquid was filtered.

19. To each of the six adsorption columns, 10 mL of buffer ED was added and centrifuged at 8,000 rpm for 2 min, and the liquid was discarded.

20. To each of the six adsorption columns, 10 mL of rinsing solution PW (anhydrous ethanol added in advance) was added and centrifuged at 8,000 rpm for 2 min, and the liquid was discarded.

21. Step 20 was repeated.

22. To each of the adsorption columns, 2 mL ddH$_2$O was added, allowed to stand for 5 min, and centrifuged at 7,000 rpm for 2 min. The liquid was poured back into the adsorption columns for another centrifugation.

23. The resulting liquid was mixed, determined for concentration, and stored at −20° C.

(5) LLC Orthotopic Lung Cancer Model:

To generate an orthotopic lung cancer model, $5\times10^6$ LLC cells were injected into nude mice via tail vein. After 30 days, mice were monitored using a non-invasive micro-CT scan to ensure successful tumor formation in the lungs. Then, the tumor-bearing mice were randomly divided into four groups, with each group injected with PBS, 5 mg/kg CMV-SCR$^R$ or CMV-SiR$^E$ gene circuit intravenously every 2 days, or 5 mg/kg gefitinib by gavage, a total of 7 administrations. The course of treatment lasted for 2 weeks.

Since mice need to be sacrificed at specific time points to remove tissues for molecular biological analysis, mice with successfully implanted tumor were randomly grouped for assessment of survival time and tumor progression. Mice used for survival analysis were monitored all the time after administration without any further treatment. For tumor progression analysis, only mice that survived until the end of the 2-week treatment were analyzed by Micro-CT. After Micro-CT scanning, mice were sacrificed, and lung tissues were removed for analysis by the histopathological staining and immunohistochemistry methods for later use.

(6) KRASLSL-G12D;P53fl/fl Transgenic Lung Cancer Model:

1. 6-week-old KRASLSL-G12D;p53fl/fl mice were anesthetized with an appropriate amount of 5% chloral hydrate.

2. The adenovirus Adeno-Cre expressing Cre was used according to an amount of $5\times10^6$ PFU/mouse, and diluted with PBS to a volume of 50 L/mouse before use.

3. Mice were shaved on the neck skin and cut longitudinally along the ventral axis of the neck to expose the main trachea.

4. The airway was fixed with an elbow tweezer, and an artery monitoring needle was guided to be inserted into the trachea through the oral cavity before the injection of the adenovirus diluent by a syringe.

5. Skin was sutured, and the wound was treated with erythromycin ointment to prevent infection.

By this method, Adenio-Cre can be accurately and targetedly delivered to the lungs of mice without remaining in the oral cavity and the respiratory tract. Tumor formation was monitored by micro-CT at different times (30, 40 and 50 days) after inhalation. 50 days after Adeno-Cre administration, mice were randomly divided into two groups and injected with 5 mg/kg CMV-scrR or CMV-siRK via tail vein for 2 weeks (7 injections). Mice were then monitored to determine survival time or to assess tumor growth.

(7) Lung Tumor Progression Monitored by Micro-CT for Small Animals:

Micro-CT analysis for small animals was used herein to evaluate lung tumor growth because, even without any contrast agent, Micro-CT images clearly distinguish the lung tumor from surrounding tissues, and the reconstructed 3-D lung images reflect the actual position of the tumor in lung tissues more visually. Micro-CT scans were performed using a SkyScan Model 1176 Micro-CT analyzer of Bruker Company, which scans 180° area at a resolution of 35 µm, with a rotation step of 0.800. The system includes two cermet tubes with fixed 0.5 mm aluminum filters and two 1280× 1024 pixel digital X-ray cameras. X-ray images were obtained at 50 kV and 500 µA. Mice were scanned in a supine position.

The micro-CT data were subjected to batch classification, processing and reconstruction using the N-Recon procedure according to the manufacturer's instructions (Bruker Company). The reconstructed data were then imaged by Data Viewer, distinguished and identified for the tumor position. Further, the tumor volume was calculated using the CTan program and the whole lung reconstruction was completed by using the CTVol program.

(8) Isolation of Exosomes:

Venous blood samples from mice were collected in plasma separator tubes. Plasma was centrifuged at 800×g for 10 min at room temperature, and cell debris was removed by centrifugation at 10,000×g for 15 min at room temperature. Supernatant plasma was recovered to isolate exosomes using the Total Exosome Isolation kit according to the manufacturer's instructions.

Figure 2A:
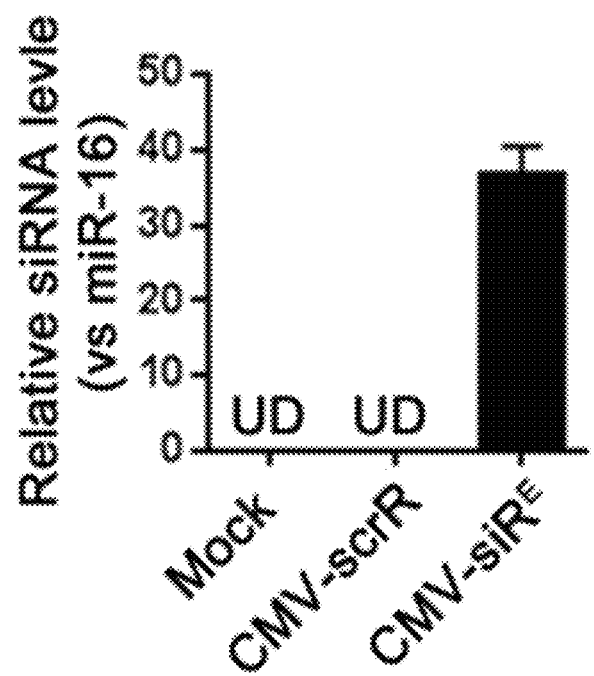
FIGS. 2A-F show the detection of the in vitro interference efficiency of plasmid molecules. The plasmids with different interference sequences were constructed according to the method shown in FIG. 1, and the interference efficiency was demonstrated by cell experiments.
Figure 2B:
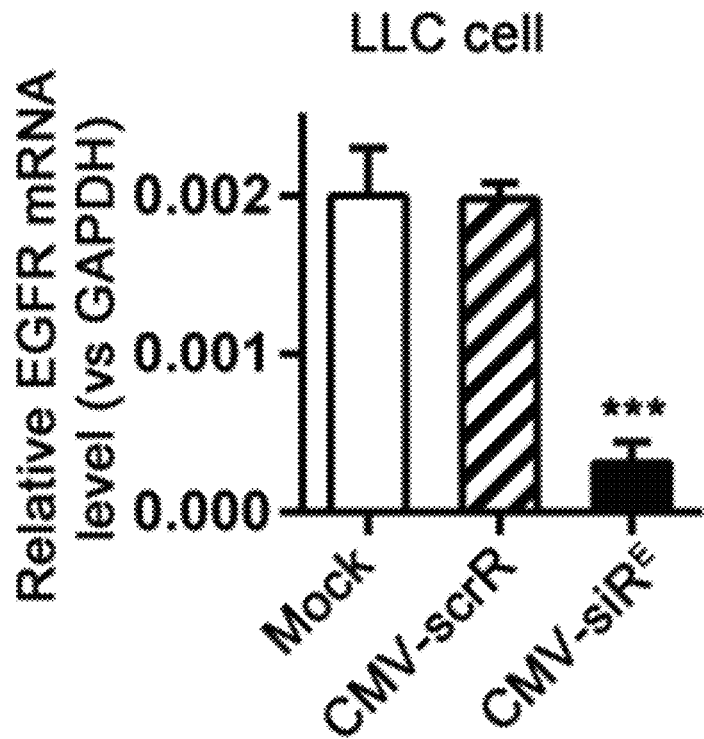
Figure 2C:
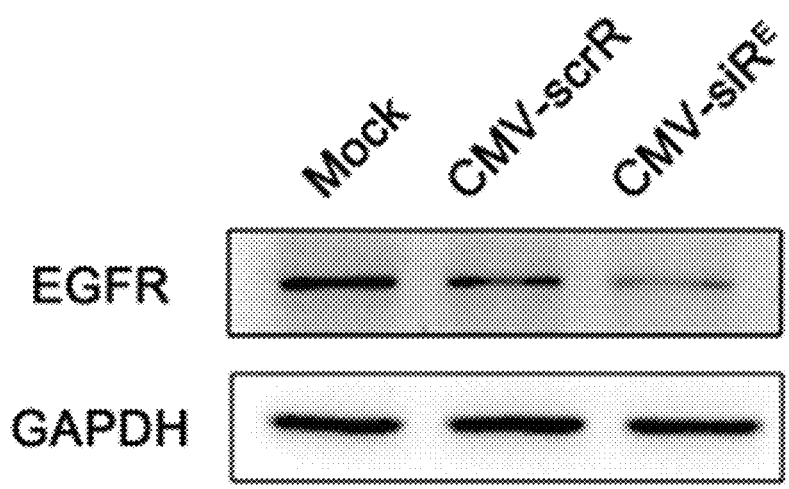
Figure 2D:
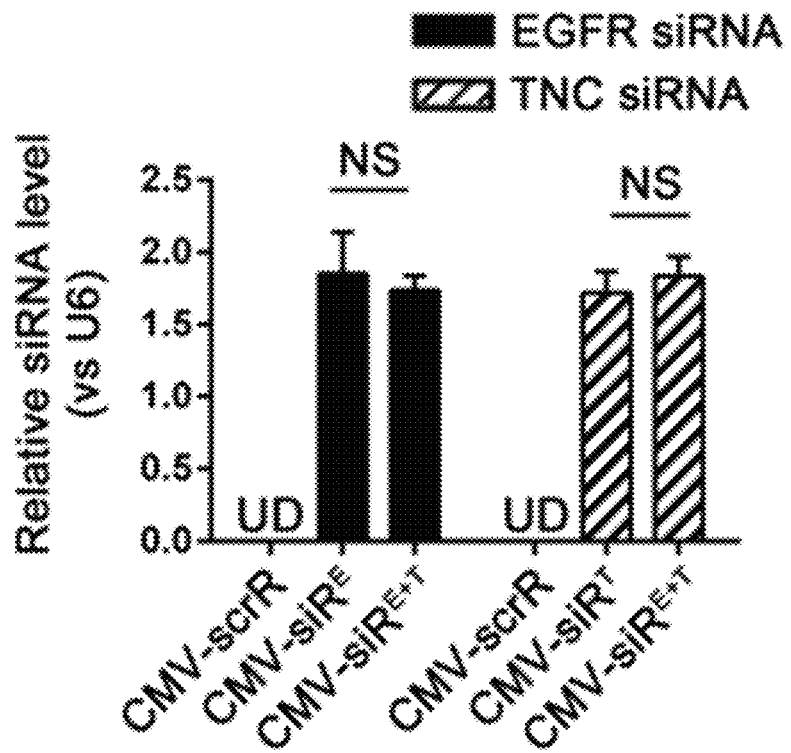
Figure 2E:
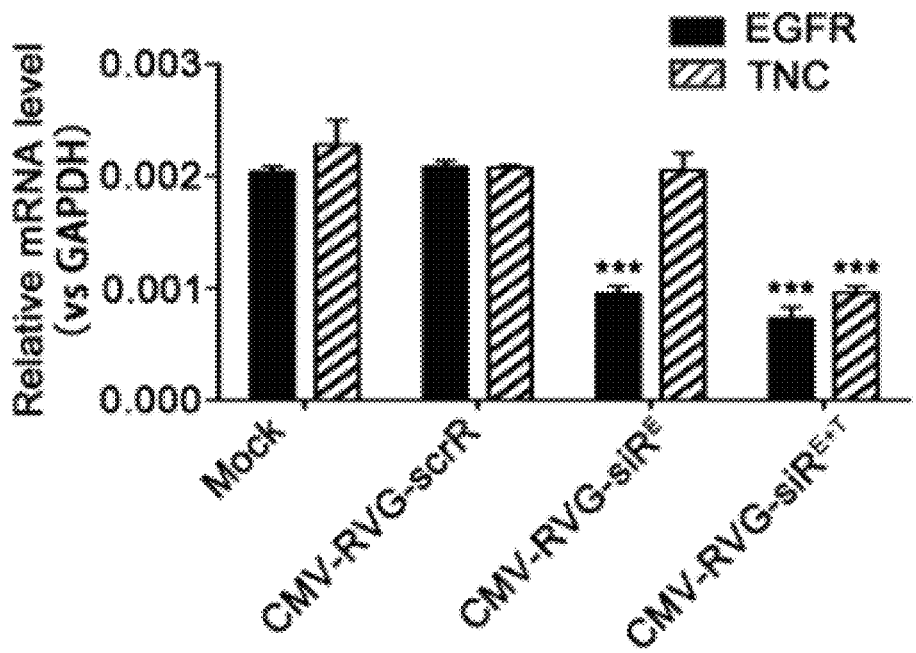
Figure 2F:
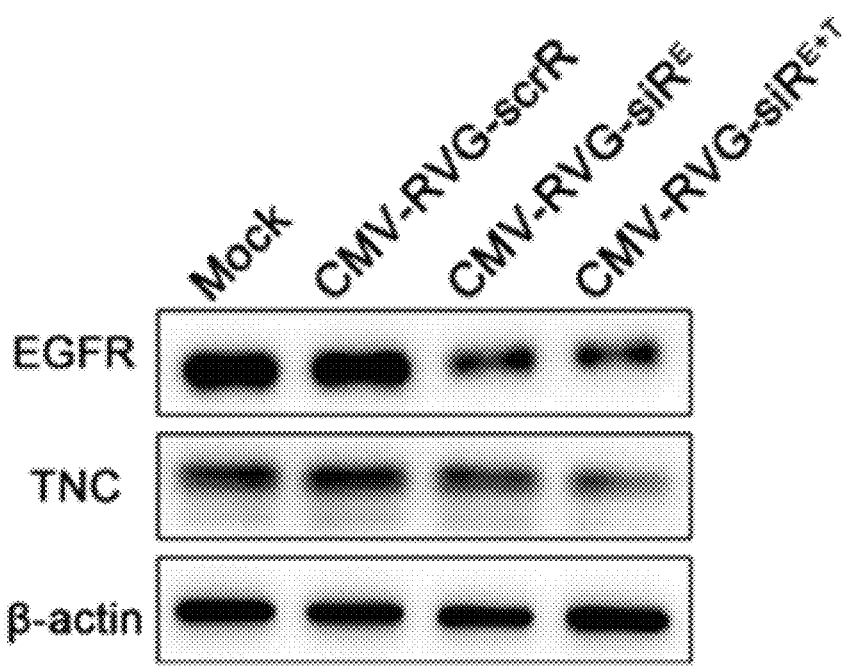

Example 1 Verification of Different Replaceable Elements and Detection of Interference Efficiency of Complete Plasmids Plasmid molecules for EGFR and TNC genes were constructed respectively. The promoter element and siRNA expression element were connected in series to construct CMV-siR$^E$, which was respectively connected to the backbone vector (FIG. 1). Plasmid molecules were transfected into mouse lung cancer cell line LLC. After 36 h, the mRNA (FIGS. 2A-B) and protein (FIG. 2C) expression levels of EGFR gene in cells were detected by qRT-PCR and Western blot experiments. The promoter element, the targeting element, and the two siRNA expression elements for EGFR and TNC genes were connected in series to construct CMV-RVG-siR$^{E+T}$ (FIG. 1). The plasmid molecule was transfected into glioblastoma cell line U87MG. After 36 h, the mRNA (FIGS. 2D-E) and protein (FIG. 2F) expression levels of EGFR and TNC genes in cells were detected by qPCR and Western blot experiments. The results show that artificially constructed siRNA expression plasmid molecules can effectively inhibit the expression of respective genes in cells.

Figure 3A:
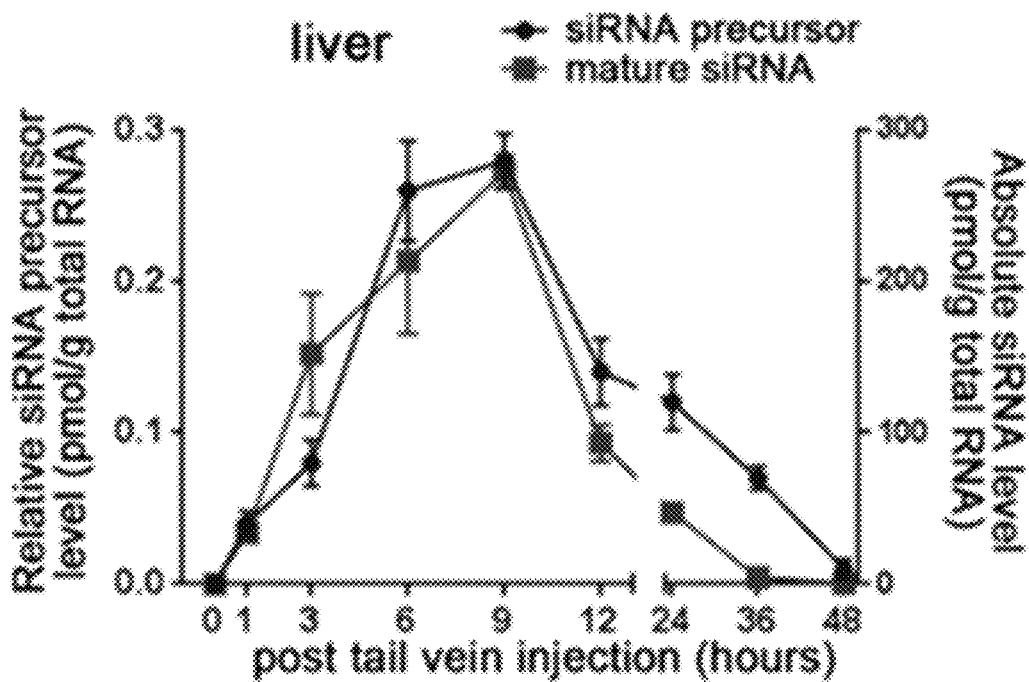
FIGS. 3A-C show the distribution of siRNA expressed by the plasmid CMV-siR$^E$ in various tissues. 1, 3, 6, 9, 12, 24, and 48 h after the injection of the plasmid, the mice were sacrificed to remove mouse tissues.
Figure 3B:
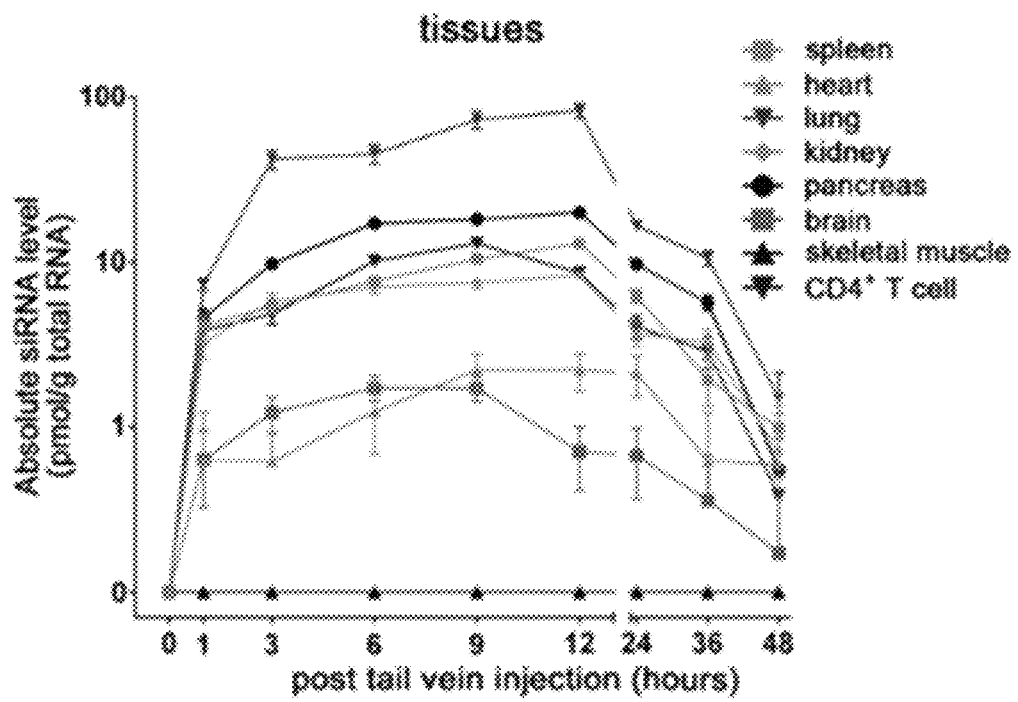
Figure 3C:
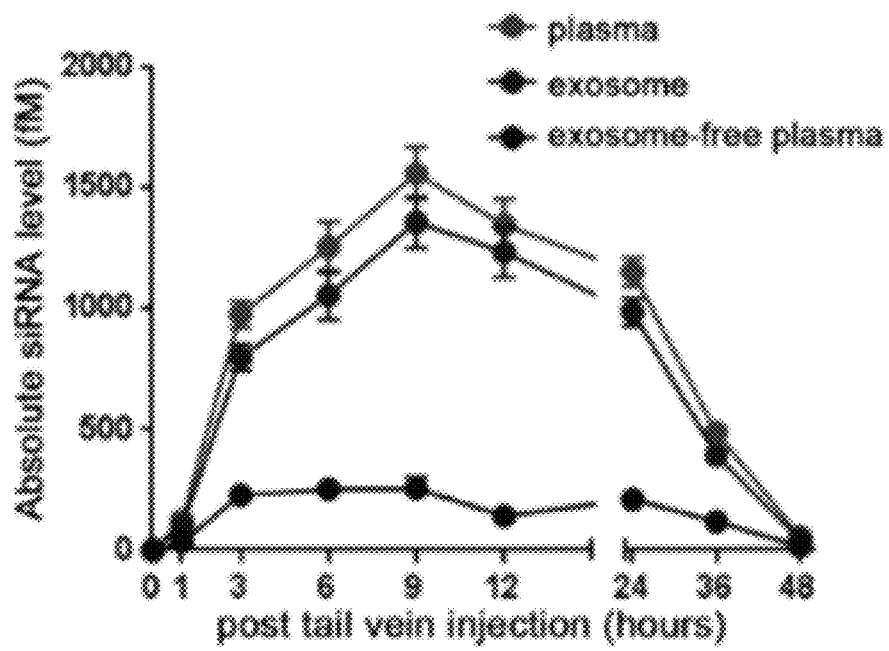

Example 2 Expression of Plasmid-Expressed siRNA in Liver and Distribution In Vivo The plasmid expressing siRNA was injected into normal mice via tail vein at a dose of 10 mg/kg. After 1, 3, 6, 9, 12, 24, and 48 h, the mice were sacrificed to remove tissues such as liver, lung, kidney, spleen, brain, heart, pancreas and muscle as well as CD4$^+$ T cells for the detection of siRNA levels. The results show that a large amount of siRNA was distributed in the liver tissue of mice (FIG. 3A), and the siRNA-expressing element could only be detected in the liver. siRNA could be detected in plasma (FIG. 3C) and mainly existed in the form of encapsulated microvesicles. A large amount of siRNA expression was detected in lung, kidney, spleen, pancreas and CD4$^+$ T cells (FIG. 3B), and the expression in other tissues was low or not detected.

Example 3 Therapeutic Effect of Plasmid Molecule on Lung Tumor Model

Figure 4A:
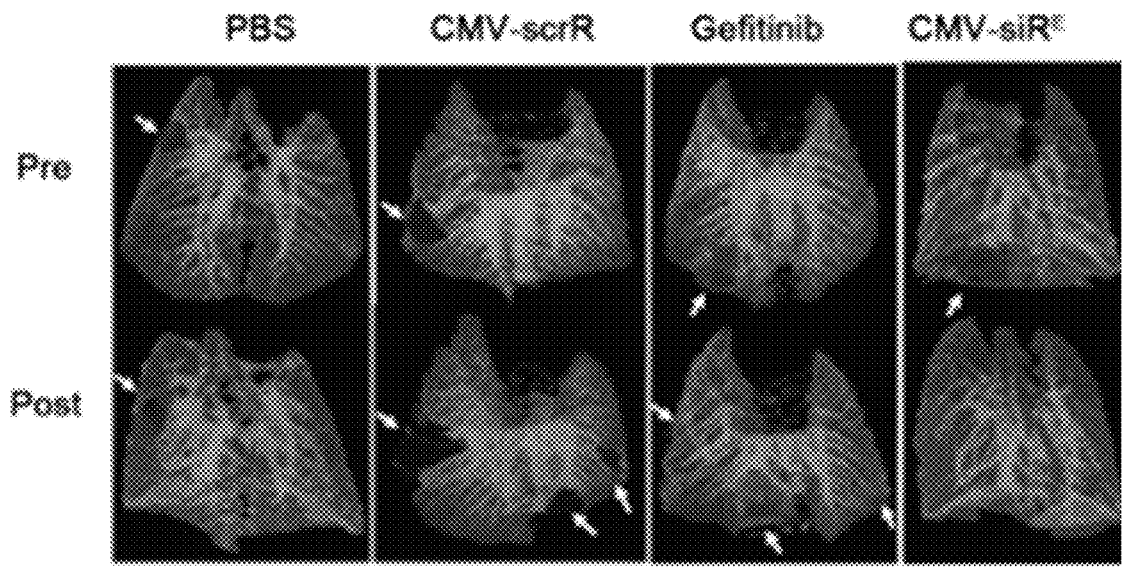
FIGS. 4A-C show the therapeutic effect and survival statistics of the plasmid molecule CMV-siRE on LLC orthotopic tumor implantation lung cancer mouse model. Mice of the LLC orthotopic tumor implantation lung cancer mouse model were equally divided into groups, with each group injected with PBS, control plasmid (CMV-scrR), gefitinib or plasmid CMV-siRE every two days for a total of 2 weeks. The tumor size of mice was detected by CT scan before and after treatment, and the survival was recorded.
Figure 4B:
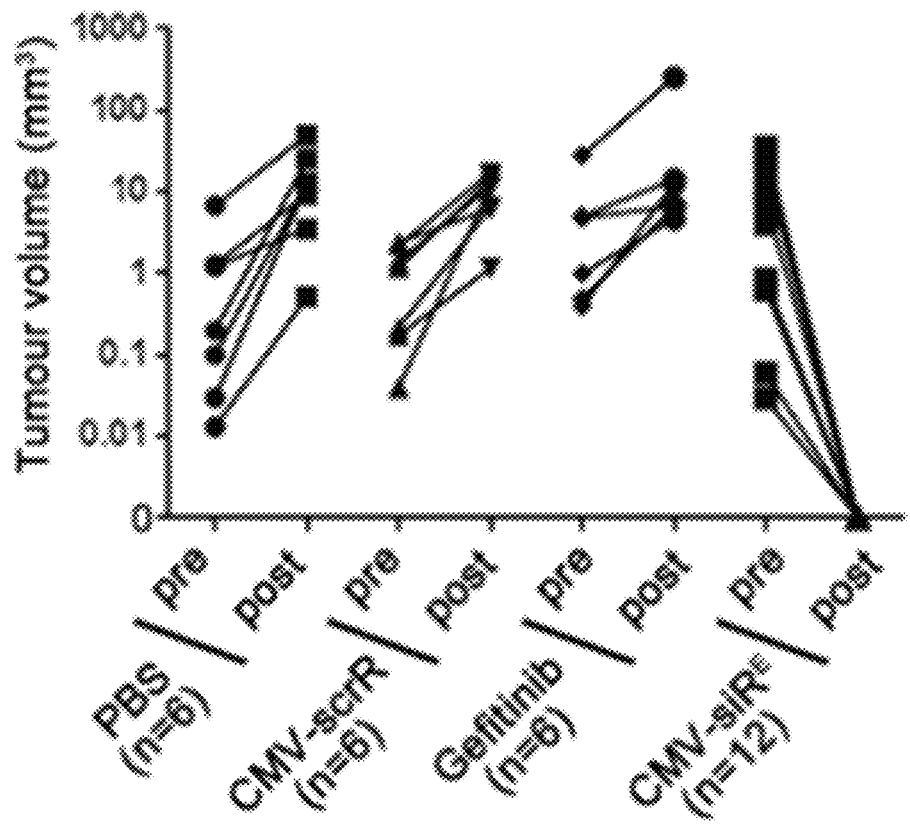
Figure 4C:
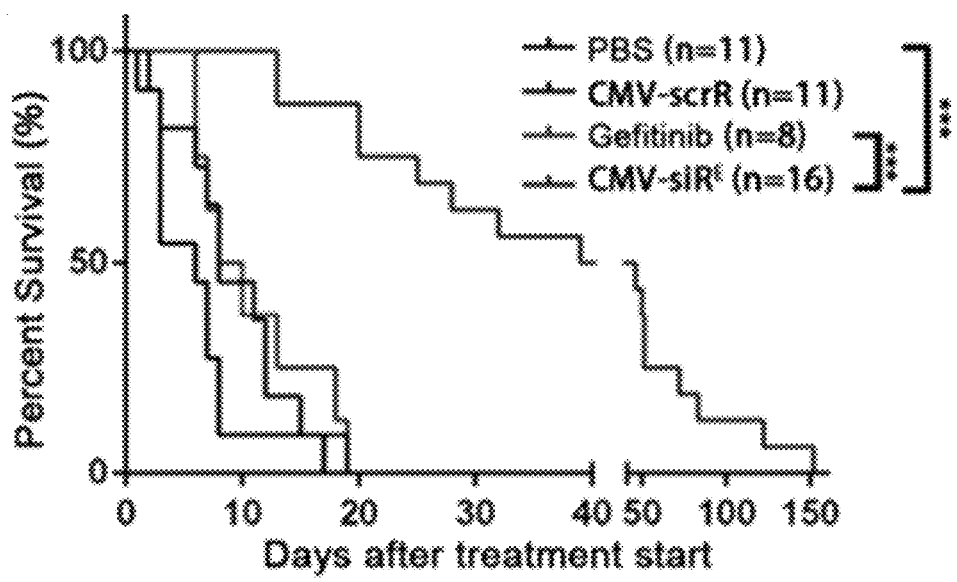

In order to further confirm the in vivo therapeutic effect of the plasmid, an LLC lung cancer orthotopic tumor implantation mouse model was used as an experimental object to demonstrate the therapeutic effect of the plasmid CMV-SiR$^E$ on lung tumors. Mice with successfully orthotopically-implanted tumor were randomly divided into four groups, with each group injected with PBS, control plasmid or CMV-SiR$^E$ plasmid, or gefitinib by gavage at a dose of 10 mg/kg. The administration was performed every 2 days for a total of two weeks of treatment. The changes of lung tumors were detected by CT imaging before and after treatment (FIG. 4A), and the survival of the mice was recorded. The results show that before and after treatment, the lung tumor volume of the mice in the CMV-siR$^E$ plasmid group significantly decreased and even completely disappeared in some mice, while the tumors in the other three groups were significantly enlarged (FIG. 4B). In addition, the survival time of the mice in the CMV-siR$^E$ plasmid group was significantly prolonged (FIG. 4C).

Figure 5A:
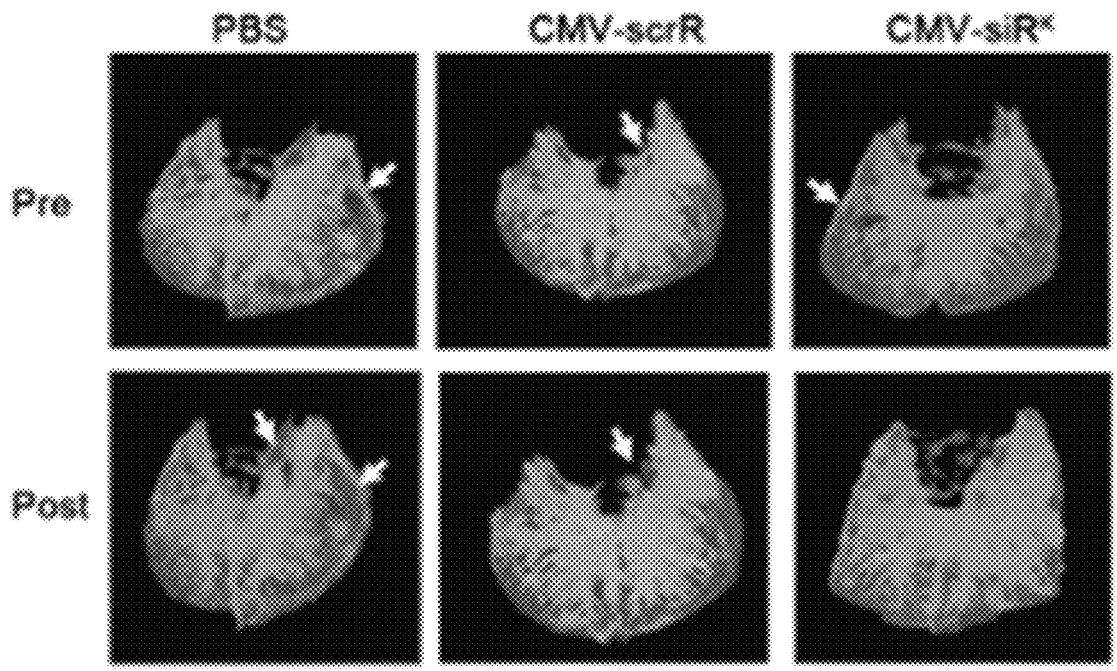
FIGS. 5A-C show the therapeutic effect and survival statistics of the plasmid molecule CMV-siRK on KrasG12D; p53fl/fl transgenic lung cancer mouse model. Mice of the KrasG12D;p53fl/fl transgenic lung cancer mouse model were equally divided into groups, with each group injected with PBS, control plasmid (CMV-scrR) or plasmid CMV-siRK every two days for a total of 2 weeks. The tumor size of mice was detected by CT scan before and after treatment, and the survival was recorded.
Figure 5B:
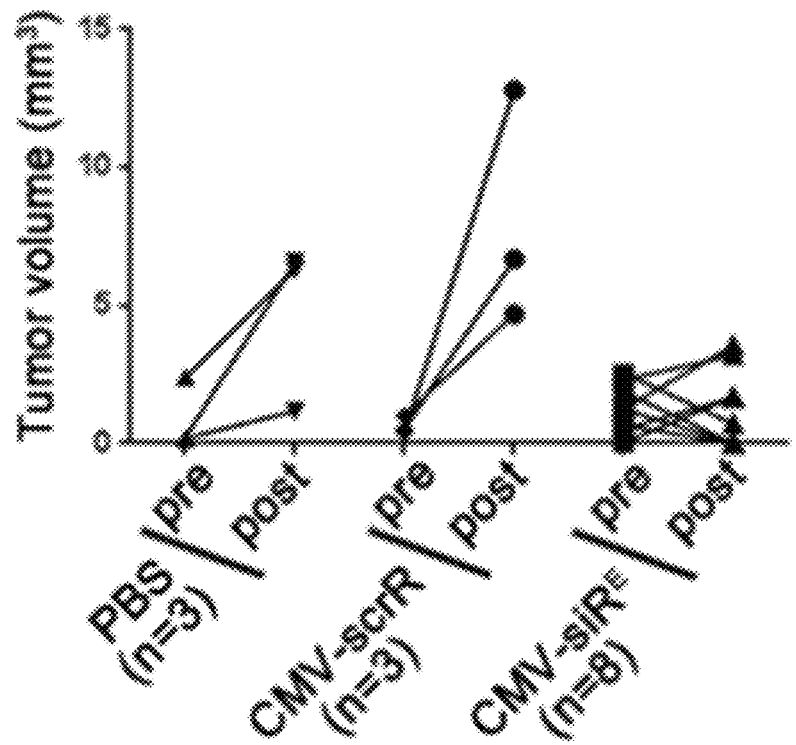
Figure 5C:
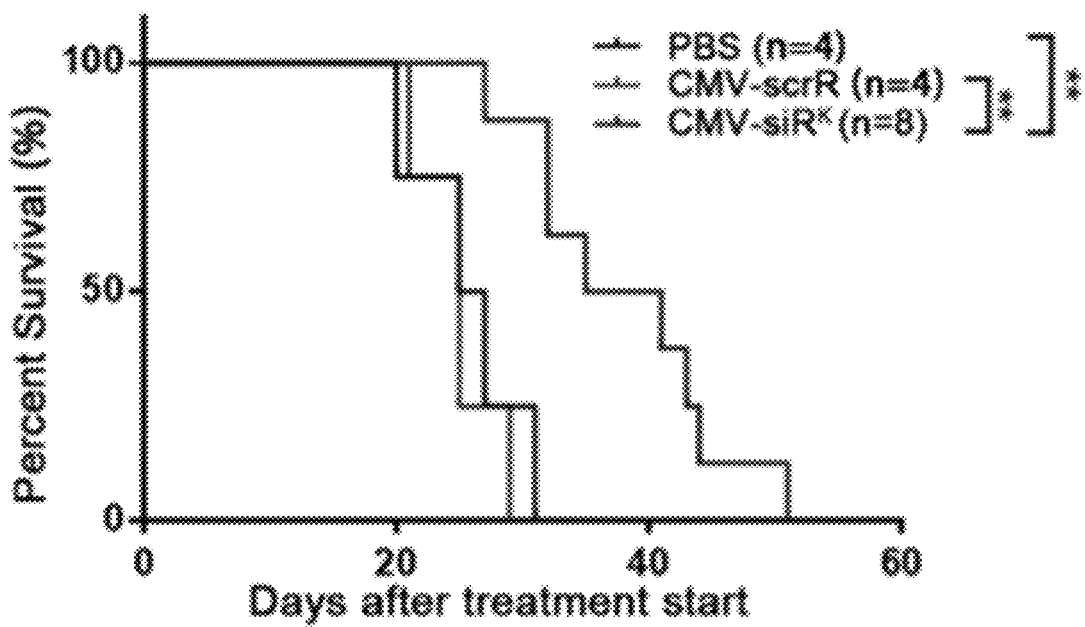

Further, the therapeutic effect of the plasmid CMV-SIR$^K$ on KrasG12D;p53fl/fl transgenic lung cancer mouse model was investigated to demonstrate the replaceability of the siRNA expression element. After verification of the successful modeling of the transgenic mice by CT imaging, the mice were randomly divided into 3 groups, with each group injected with PBS, control plasmid (CMV-scrR) or plasmid CMV-SIR$^K$ at a dose of 10 mg/kg. The administration was performed every 2 days for a total of two weeks of treatment. The changes of lung tumors were detected by CT imaging before and after treatment (FIG. 5A), and the survival of the mice was recorded. The results show that before and after treatment, the lung tumor progression of the mice in the CMV-siR$^K$ plasmid group was significantly alleviated, and even completely disappeared in some mice, while the tumors in the other two groups were significantly enlarged (FIG. 5B). In addition, the survival time of the mice in the CMV-siR$^K$ plasmid group was significantly prolonged (FIG. 5C).

Figure 6A:
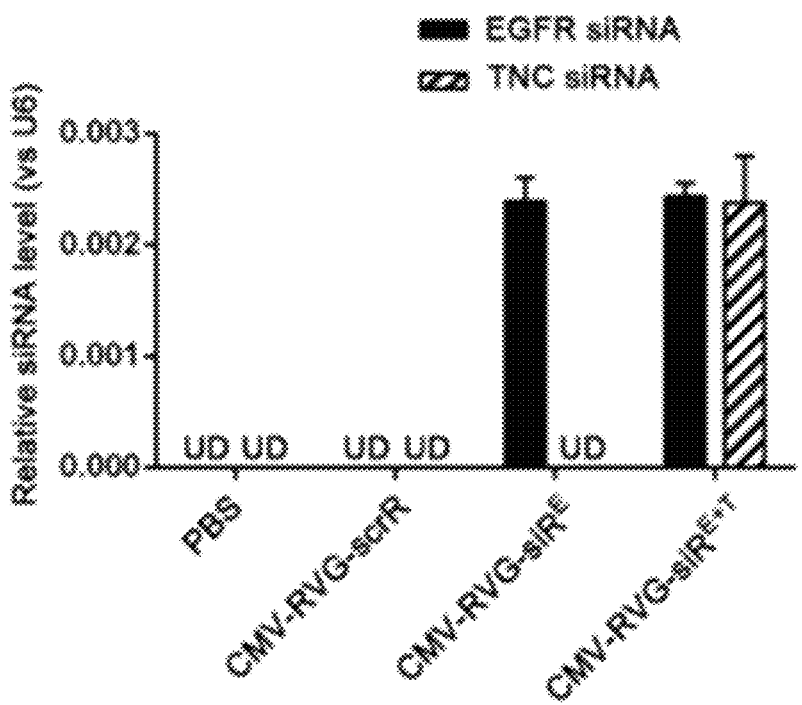
FIGS. 6A-E show the therapeutic effect and survival statistics of the plasmid molecule CMV-RVG-siRE+T on orthotopic glioblastoma implantation mouse model. Mice of the orthotopic glioblastoma implantation mouse model were equally divided into groups, with each group injected with PBS, control plasmid (CMV-scrR) or plasmid CMV-RVG-siRE+T every two days. By the detection of the expression level of siRNA and protein, it was demonstrated that plasmid CMV-RVG-siRE+T can effectively deliver siRNA to brain and inhibit the expression of EGFR and TNC genes. The mice were treated for 2 weeks. Changes in mouse tumor size were detected by intravital imaging, and the survival was recorded.
Figure 6B:
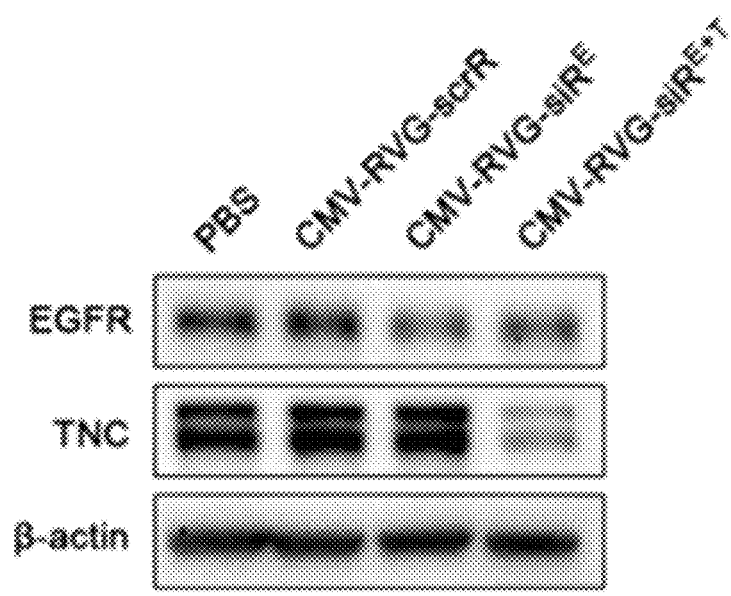
Figure 6C:
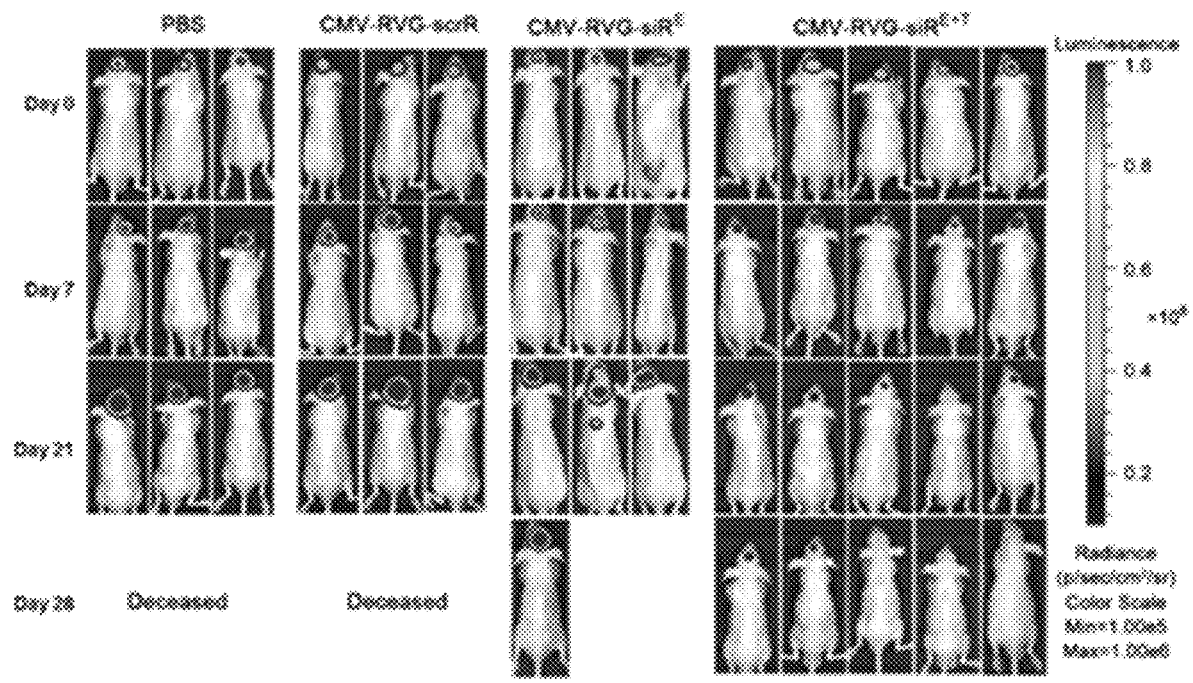
Figure 6D:
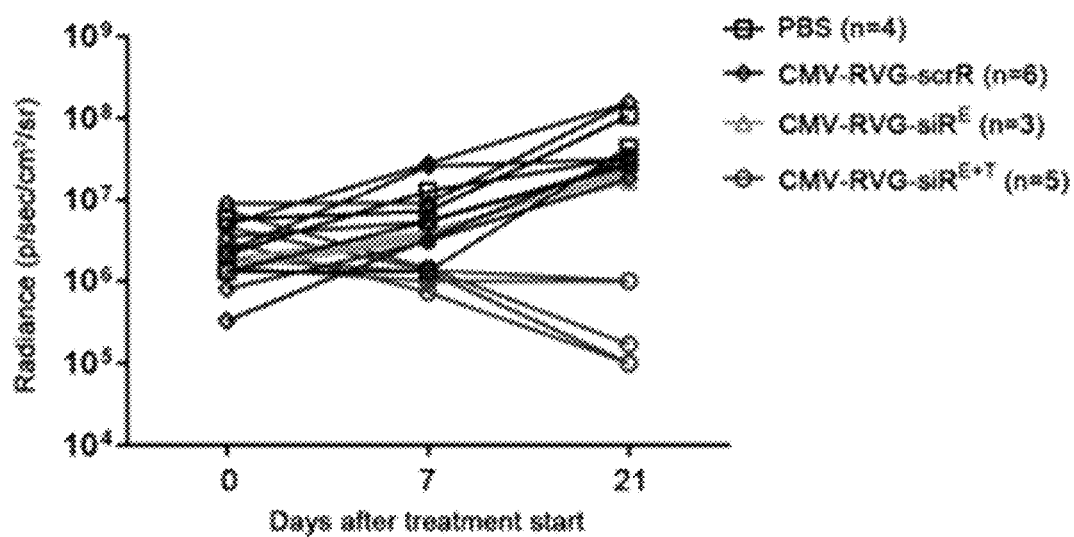
Figure 6E:
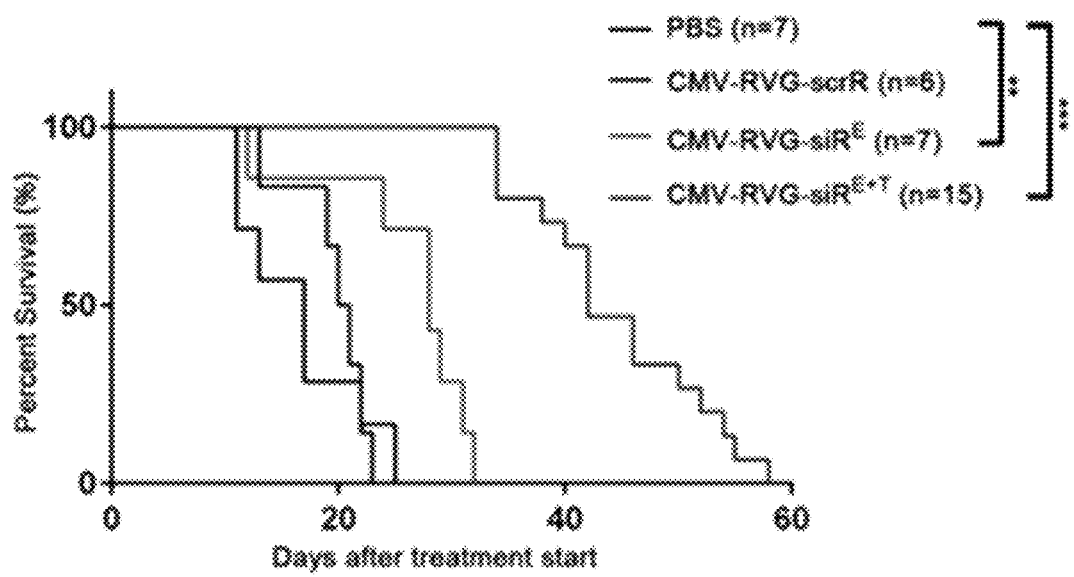

Example 4 Therapeutic Effect of Dual-siRNA Plasmid Molecule with Targeting Peptide Element on Glioblastoma Mouse Model Since the plasmid containing only the promoter element and the siRNA expression element fails to effectively deliver the siRNA to the brain, the element expressing the peptide segment from the rabies virus RVG was integrated into the plasmid vector. Meanwhile, in order to achieve a better inhibitory effect, the siRNA expression elements inhibiting the EGFR gene and the TNC gene respectively were jointly integrated into the plasmid vector to construct the plasmid molecule CMV-RVG-siR$^{E+T}$. By the detection of the expression level of siRNA in brain tissue (FIGS. 6A-B), it was demonstrated that this design can effectively deliver siRNA to brain tissue. Then, a mouse glioblastoma orthotopic model was used to demonstrate the therapeutic effect of the plasmid. Mice were randomly divided into 3 groups, with each group injected with PBS, control plasmid (CMV-scrR) or plasmid CMV-RVG-siR$^{E+T}$ at a dose of 10 mg/kg. The administration was performed every 2 days for a total of two weeks of treatment. The tumor volume was monitored and detected by intravital imaging (FIG. 6C). The results show that the injection of plasmid CMV-RVG-siR$^{E+T}$ could effectively inhibit glioblastoma. The tumor volume of the mice in the experimental group significantly decreased, and the survival time was significantly prolonged (FIGS. 6D-E).

Example 5 Detection of In Vivo Safety

Figure 7A:
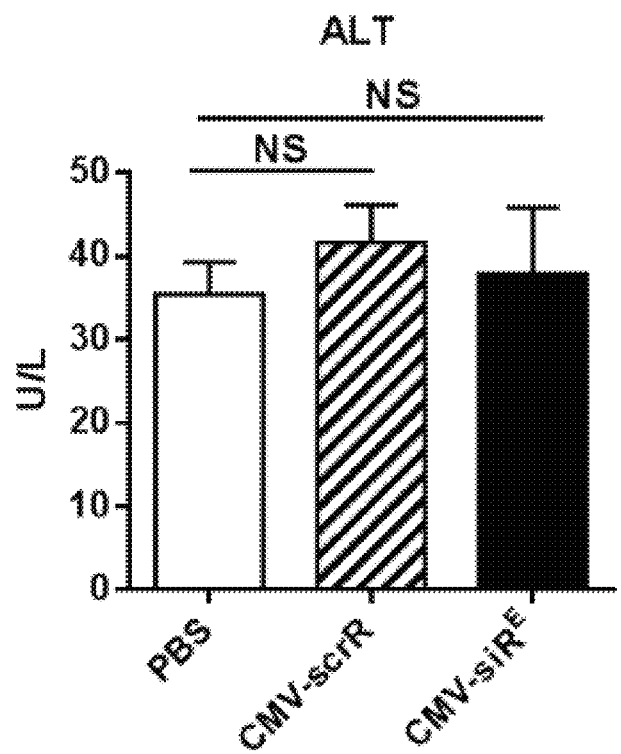
FIGS. 7A-G show the detection of the safety of plasmid administration.
Figure 7B:
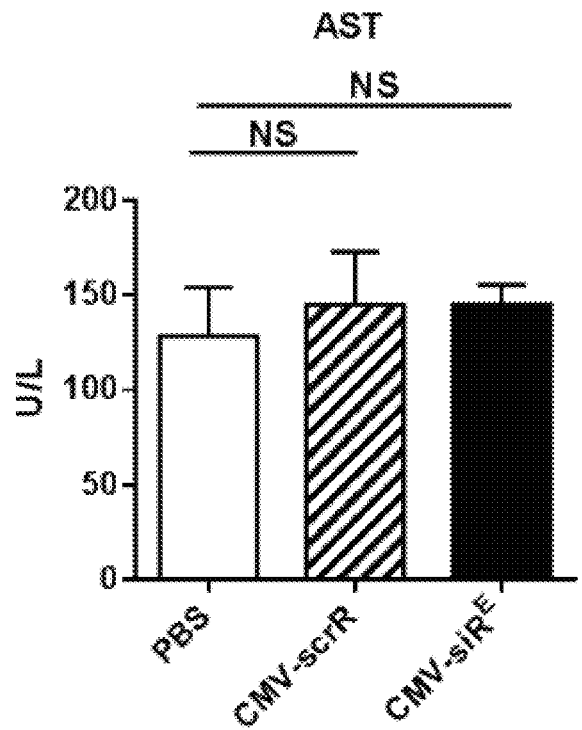
Figure 7C:
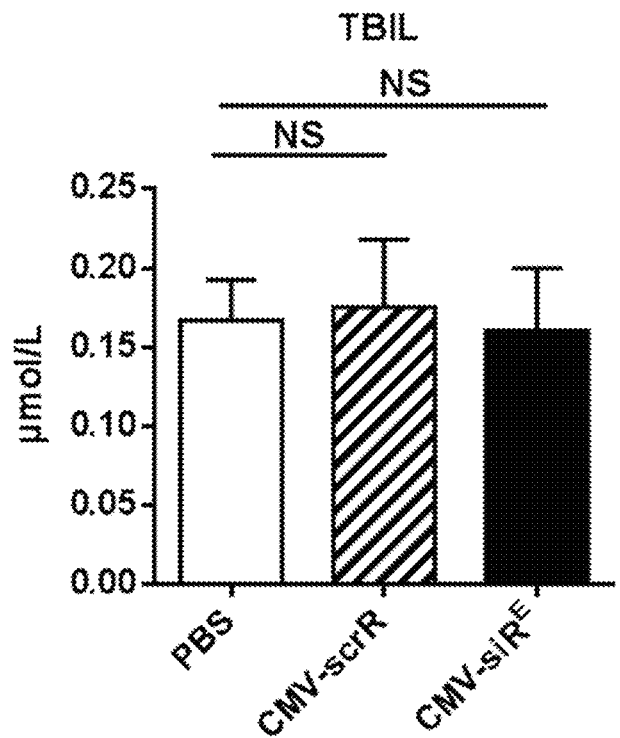
Figure 7D:
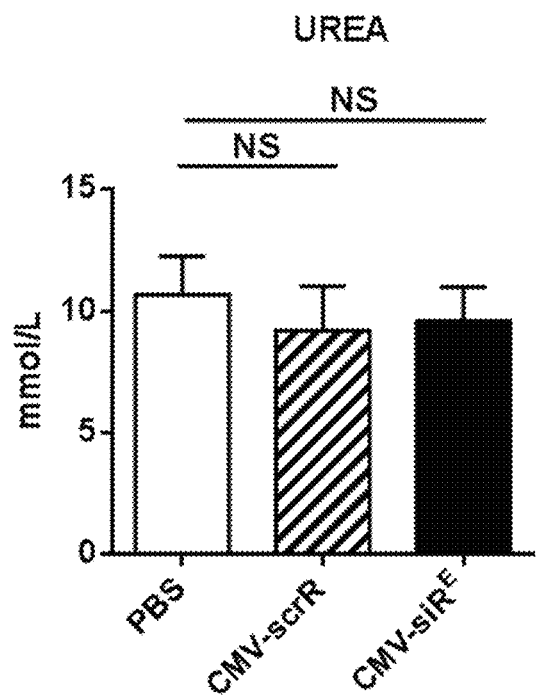
Figure 7E:
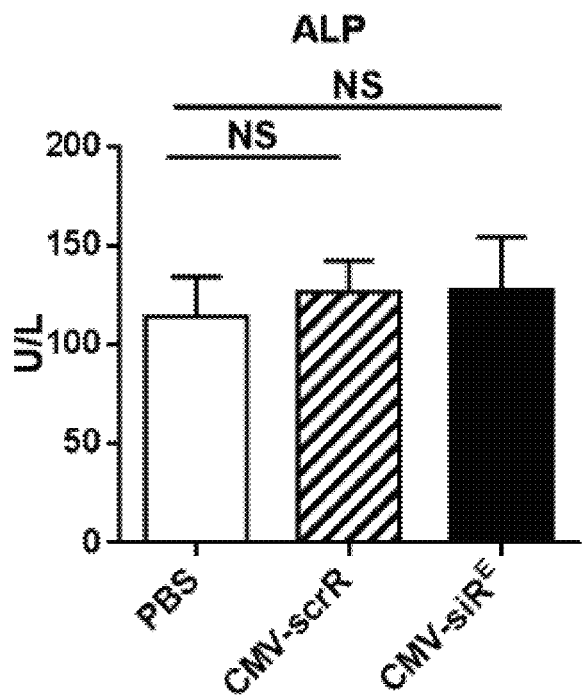
Figure 7F:
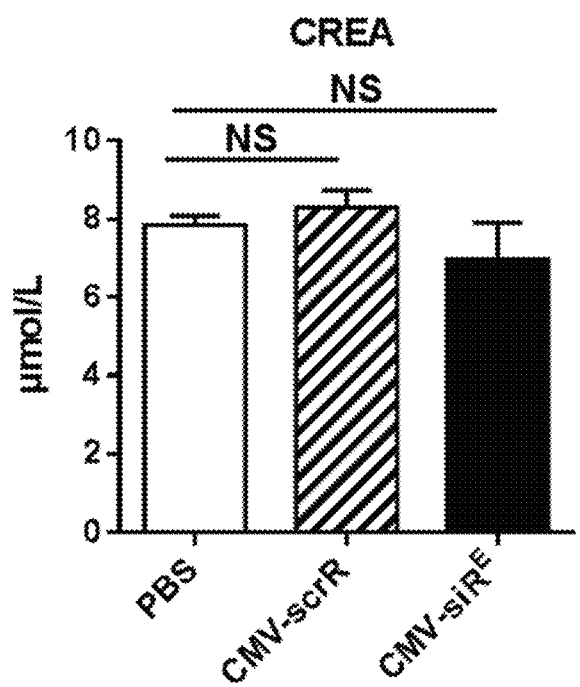
Figure 7G:
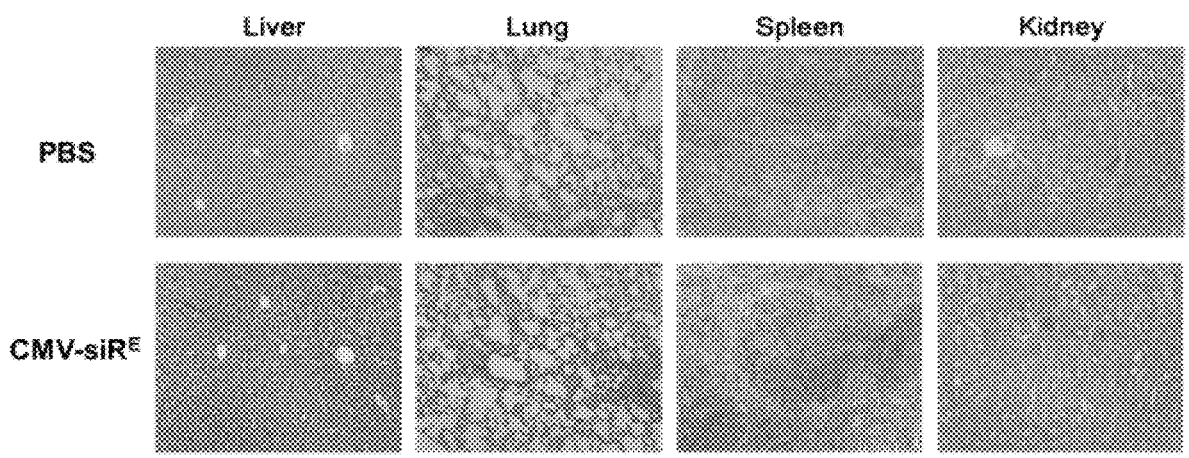

In order to detect the safety of this treatment, the levels of biochemical indexes were detected such as glutamic-pyruvic transaminase (FIG. 7A), glutamic-oxaloacetic transaminase (FIG. 7B), total bilirubin (FIG. 7C), urea (FIG. 7D), alkaline phosphatase (FIG. 7E) and creatinine (FIG. 7F) in serum of the mice in the control group and the experimental group injected with the plasmid molecule. The results show that the above indexes of the mice in the experimental group injected with the plasmid molecule were not significantly different from those in the control group. Sections of liver, lung, kidney and spleen showed that the injection of the plasmid via tail vein would not cause tissue damage and is a relatively safe way of administration (FIG. 7G).

All documents mentioned herein are incorporated by reference in this application, as if each document is individually incorporated by reference. In addition, it should be understood that after reading the above teachings of the present disclosure, those skilled in the art may make various modifications or variations to the present disclosure, and these equivalents also fall within the scope defined by the appended claims of this application.

The invention claimed is:

1. A siRNA composition, comprising:
   a first siRNA molecule that reduces the expression of a first target gene;
   an optional coding sequence for a targeting peptide element; and
   a second siRNA molecule that reduces the expression of a second target gene,
   wherein the first siRNA molecule has a sequence as shown in SEQ ID NO: 1 and/or SEQ ID NO: 2, and the first target gene is selected from the group consisting of EGFR, KRAS, or a combination thereof; and
   wherein the second siRNA molecule has a sequence as shown in SEQ ID NO: 3, and the second target gene is TNC.

2. The siRNA composition of claim 1, wherein the siRNA composition comprises the coding sequence for the targeting peptide element, and the targeting peptide element is selected from the group consisting of RVG, LAMP2B, or a combination thereof.

3. The siRNA composition of claim 2, wherein the coding sequence for the targeting peptide element is as shown in SEQ ID NO: 4.

4. The siRNA composition of claim 1, which is involved in a method of preparing a medicament or formulation for treating cancer.

5. A vector, comprising:
   a promoter element;
   a first siRNA molecule that reduces the expression of a first target gene;
   an optional coding sequence for a targeting peptide element; and
   a second siRNA molecule that reduces the expression of a second target gene,
   wherein the first siRNA molecule has a sequence as shown in SEQ ID NO: 1 and/or SEQ ID NO: 2, and the first target gene is selected from the group consisting of EGFR, KRAS, or a combination thereof; and
   wherein the second siRNA molecule has a sequence as shown in SEQ ID NO: 3, and the second target gene is TNC.

6. The vector of claim 5, wherein the vector has a structure represented by formula I in 5'-3':

$$Z0\text{-}Z1\text{-}Z2\text{-}Z3 \qquad (I),$$

wherein Z0 is the promoter element;
   Z1 is the optional coding sequence for the targeting peptide element;
   Z2 is the first siRNA molecule that reduces the expression of the first target gene; and
   Z3 is the second siRNA molecule that reduces the expression of the second target gene.

7. The vector of claim 5, wherein the vector comprises the coding sequence for the targeting peptide element, and the targeting peptide element is selected from the group consisting of RVG, LAMP2B, or a combination thereof.

8. The vector of claim 7, wherein the coding sequence for the targeting peptide element is as shown in SEQ ID NO: 4.

9. The vector of claim 5, which is involved in a method of preparing a medicament or formulation for treating cancer.

10. A pharmaceutical preparation, comprising:
(a) a vector; and
(b) a pharmaceutically acceptable carrier,
wherein the vector comprises:
   a promoter element;
   a first siRNA molecule that reduces the expression of a first target gene;
   an optional coding sequence for a targeting peptide element; and
   a second siRNA molecule that reduces the expression of a second target gene,
wherein the first siRNA molecule has a sequence as shown in SEQ ID NO: 1 and/or SEQ ID NO: 2, and the first target gene is selected from the group consisting of EGFR, KRAS, or a combination thereof; and
wherein the second siRNA molecule has a sequence as shown in SEQ ID NO: 3, and the second target gene is TNC.

11. The pharmaceutical preparation of claim 10, which is involved in a method of preparing a medicament or formulation for treating cancer.

12. The pharmaceutical preparation of claim 10, wherein the vector has a structure represented by formula I in 5'-3':

$$Z0\text{-}Z1\text{-}Z2\text{-}Z3 \quad (I),$$

wherein Z0 is the promoter element;
Z1 is the optional coding sequence for the targeting peptide element;
Z2 is the first siRNA molecule that reduces the expression of the first target gene; and
Z3 is the second siRNA molecule that reduces the expression of the second target gene.

13. The pharmaceutical preparation of claim 10, wherein the vector comprises the coding sequence for the targeting peptide element, and the targeting peptide element is selected from the group consisting of RVG, LAMP2B, or a combination thereof.

14. The pharmaceutical preparation of claim 13, wherein the coding sequence for the targeting peptide element is as shown in SEQ ID NO: 4.

* * * * *